United States Patent
Ikushima et al.

(10) Patent No.: US 8,487,505 B2
(45) Date of Patent: Jul. 16, 2013

(54) POLYMER ACTUATOR

(75) Inventors: Kimiya Ikushima, Osaka (JP); Sachio Nagamitsu, Kyoto (JP); Kazuo Yokoyama, Osaka (JP)

(73) Assignee: Panasonic Corporation, Osaka (JP)

( * ) Notice: Subject to any disclaimer, the term of this patent is extended or adjusted under 35 U.S.C. 154(b) by 336 days.

(21) Appl. No.: 13/000,748

(22) PCT Filed: Mar. 3, 2010

(86) PCT No.: PCT/JP2010/001440
§ 371 (c)(1),
(2), (4) Date: Dec. 22, 2010

(87) PCT Pub. No.: WO2010/100907
PCT Pub. Date: Sep. 10, 2010

(65) Prior Publication Data
US 2011/0121691 A1 May 26, 2011

(30) Foreign Application Priority Data

Mar. 4, 2009 (JP) ................. 2009-050079

(51) Int. Cl.
*H02N 11/00* (2006.01)
*H01L 41/16* (2006.01)
(52) U.S. Cl.
USPC ........................... 310/300; 310/800
(58) Field of Classification Search
USPC ................................. 310/300, 800
See application file for complete search history.

(56) References Cited

U.S. PATENT DOCUMENTS

| 5,500,292 | A  | * | 3/1996 | Muranaka et al. | ............ | 429/209 |
| 6,555,945 | B1 | * | 4/2003 | Baughman et al. | ........... | 310/300 |
| 7,583,009 | B2 | * | 9/2009 | Nagai et al. | ................... | 310/328 |
| 8,062,007 | B2 | * | 11/2011 | Ikushima et al. | ........... | 417/413.1 |
| 2007/0247033 | A1 | | 10/2007 | Eidenschink et al. | | |
| 2009/0091829 | A1 | | 4/2009 | Nagai et al. | | |

FOREIGN PATENT DOCUMENTS

| JP | 6-235376 | 8/1994 |
| JP | 2006-246659 | 9/2006 |
| JP | 3959104 | 5/2007 |
| JP | 2009-46649 | 3/2009 |
| JP | 2009-50046 | 3/2009 |
| JP | 2009-92727 | 4/2009 |
| JP | 2009-535093 | 10/2009 |

OTHER PUBLICATIONS

International Search Report issued May 25, 2010 in International (PCT) Application No. PCT/JP2010/001440.
International Preliminary Report on Patentability issued Sep. 22, 2011 in International (PCT) Application No. PCT/JP2010/001440, together with English translation thereof.

* cited by examiner

*Primary Examiner* — Thomas Dougherty
(74) *Attorney, Agent, or Firm* — Wenderoth, Lind & Ponack, L.L.P.

(57) ABSTRACT

There is provided a polymer actuator including a first electrode layer as an active member layer made of a conductive polymer, a second electrode layer opposing to the first electrode layer, and an electrolyte placed between the first electrode layer and the second electrode layer, so that the polymer actuator is driven by a voltage applied between both the electrode layers, wherein the electrolyte is constituted by a first electrolyte layer having a sliding function and a second electrolyte layer having an insulation maintaining function.

14 Claims, 32 Drawing Sheets

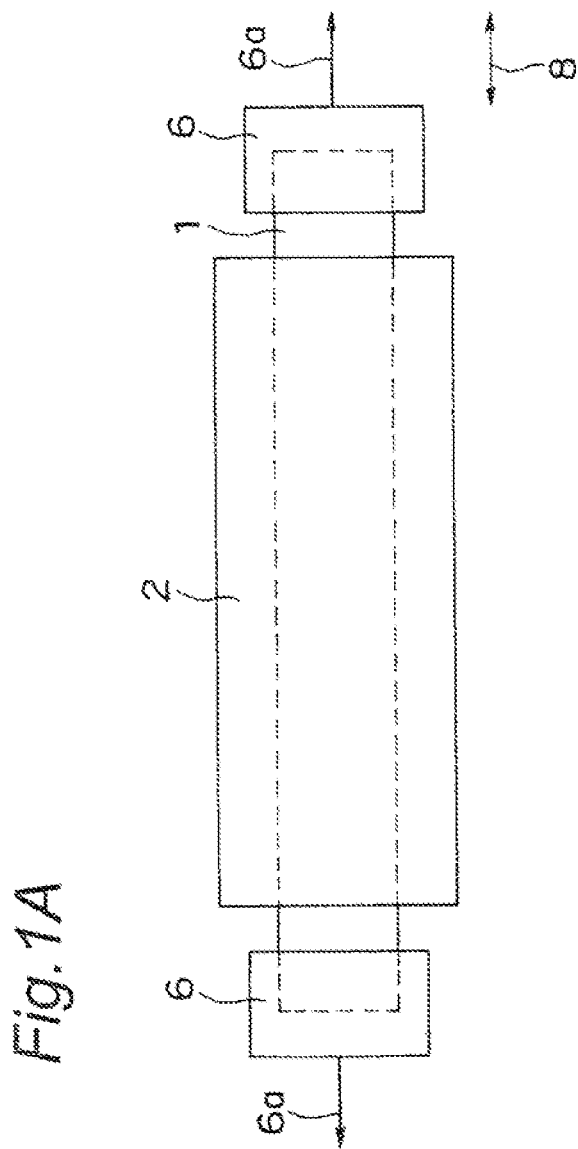

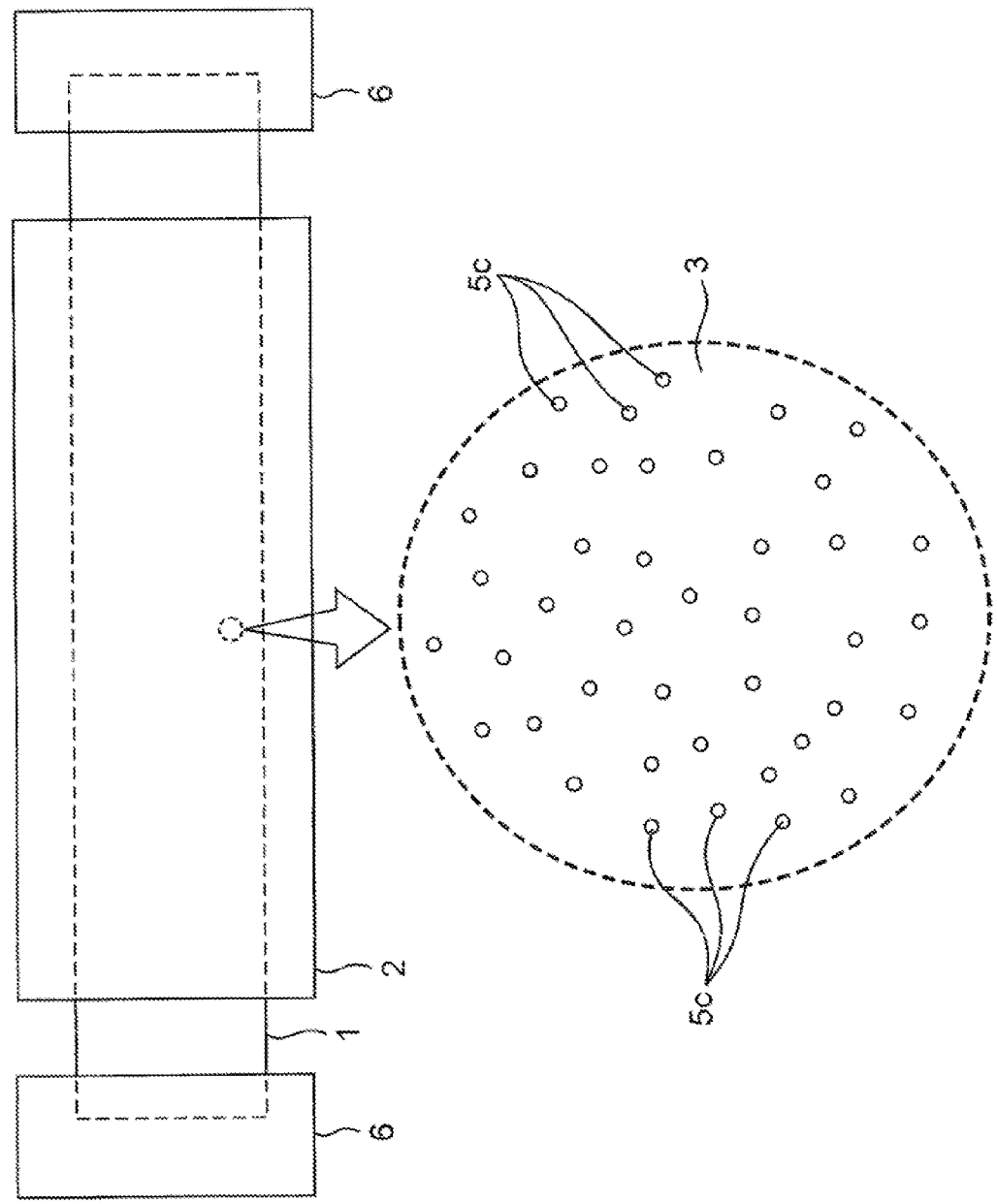

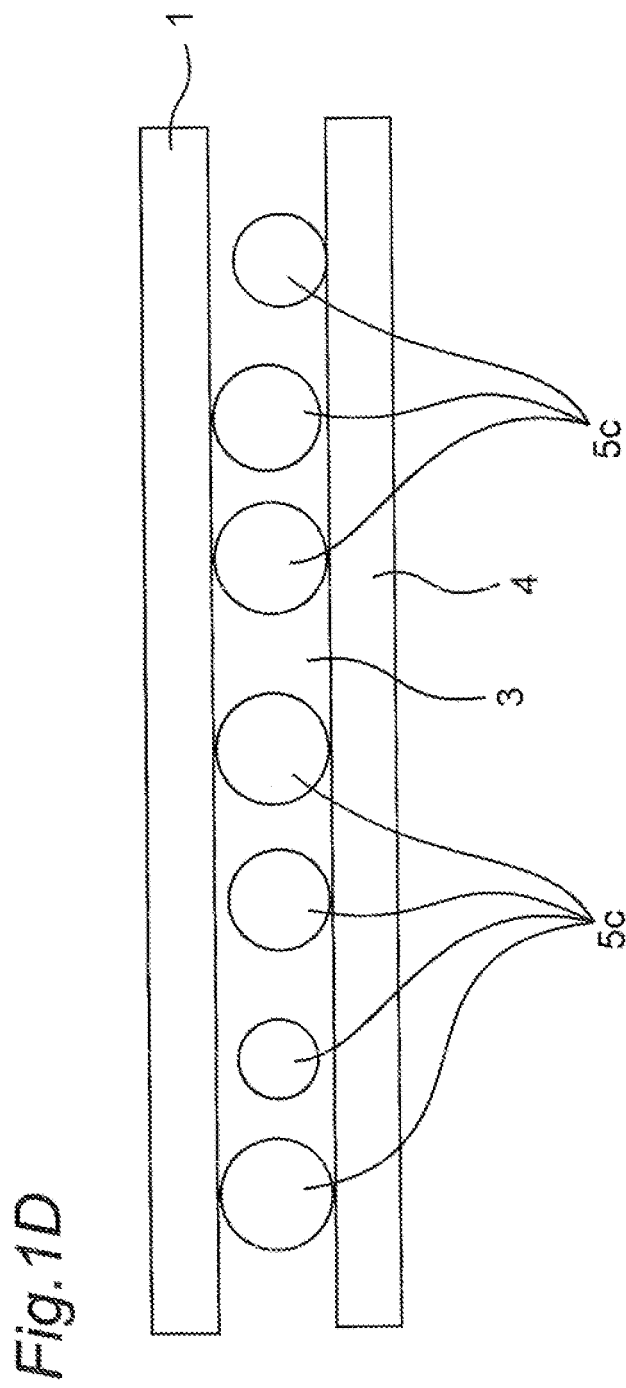

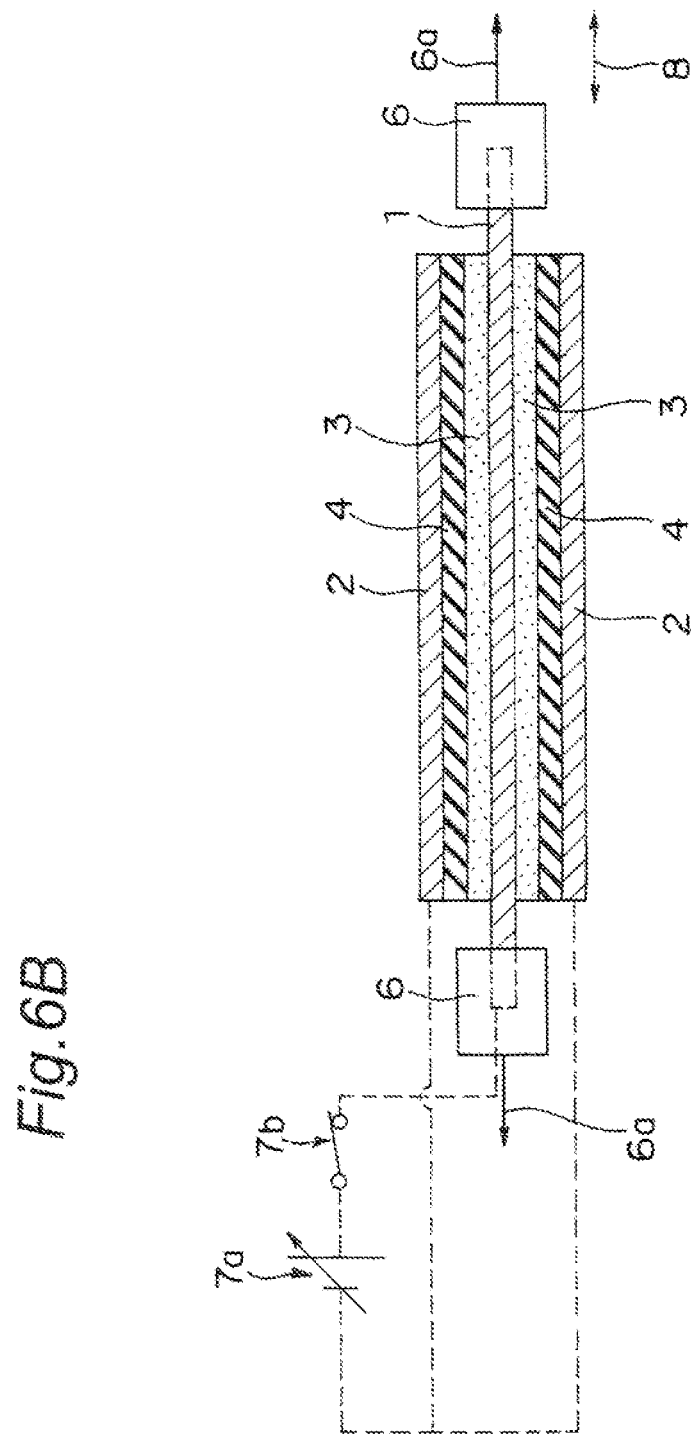

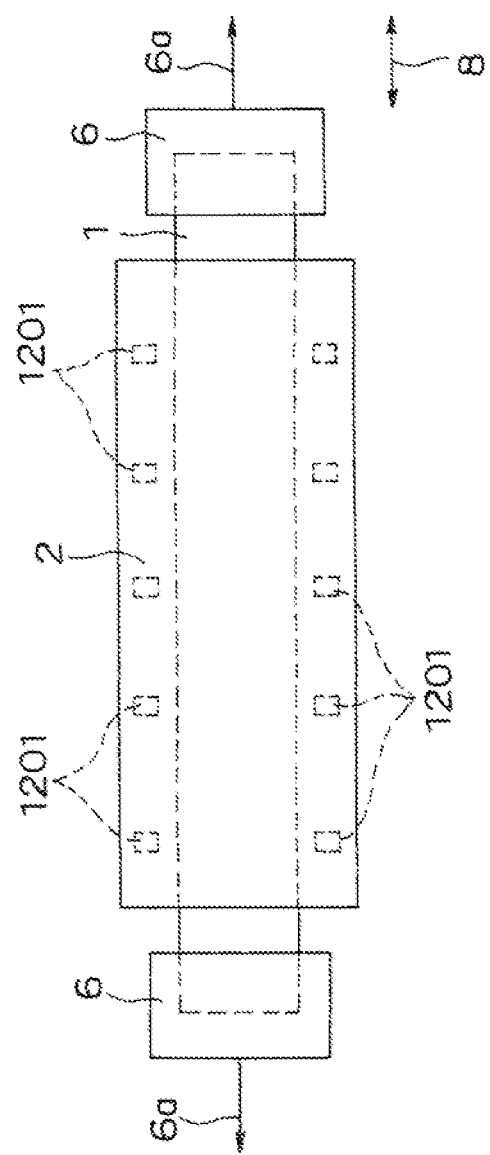

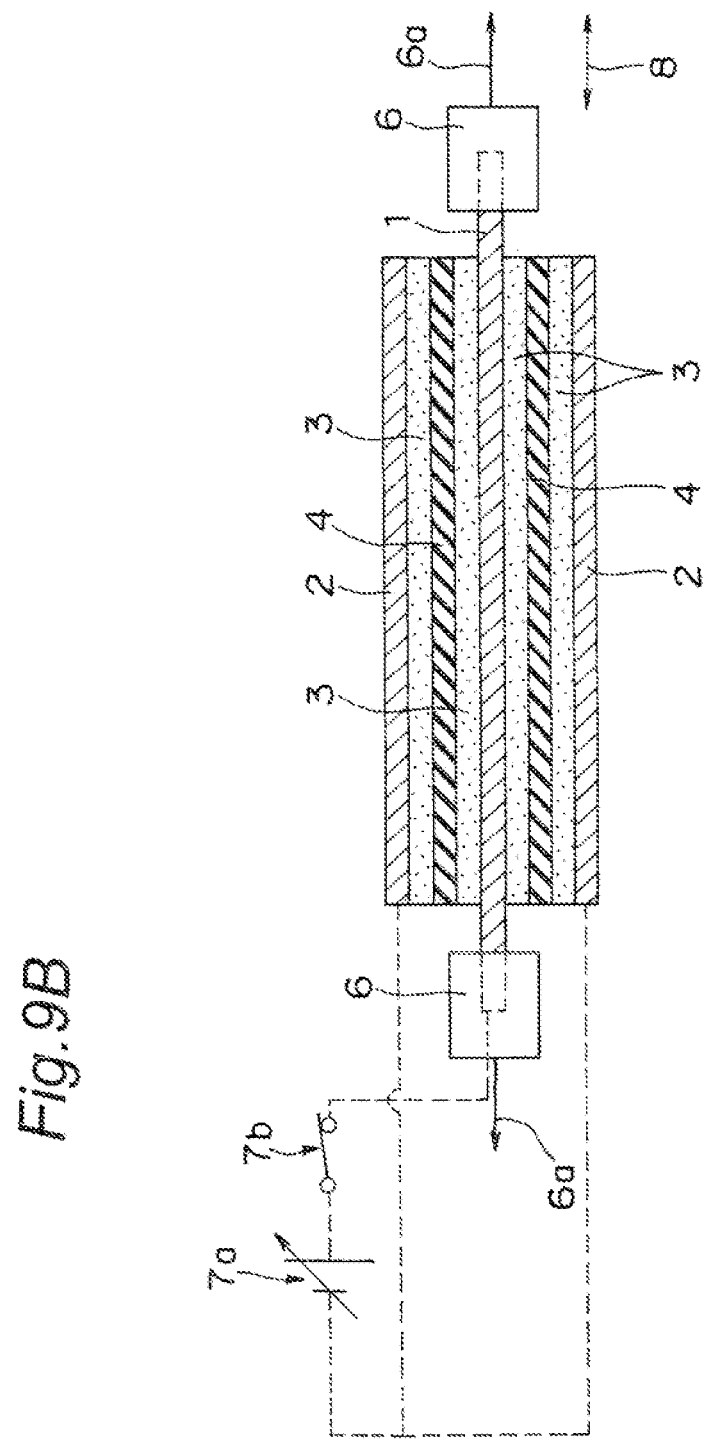

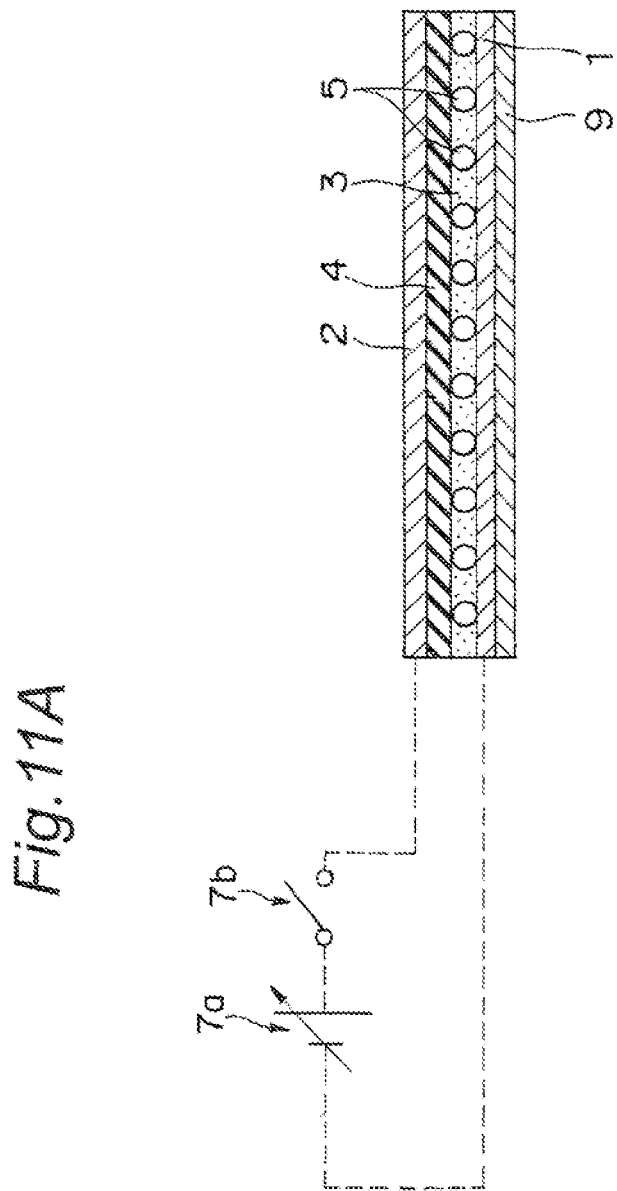

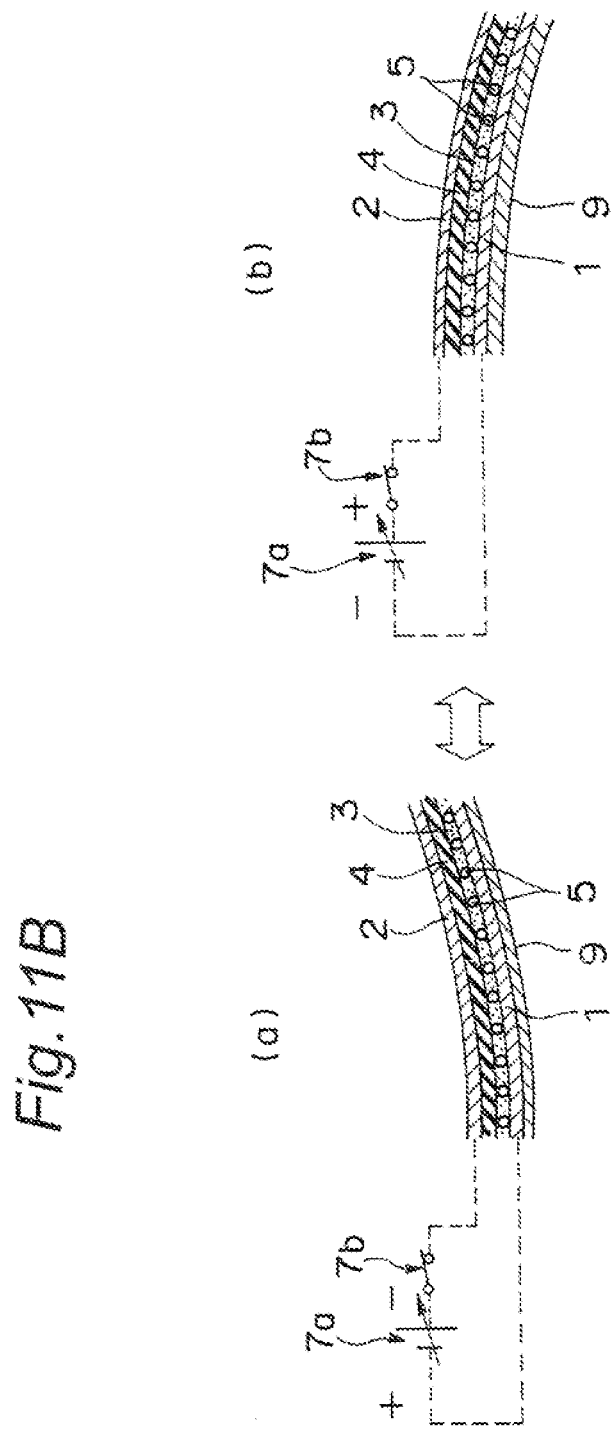

POLYMER ACTUATOR

TECHNICAL FIELD

The present invention relates to a polymer actuator made of a polymer which is operated by electric signals and usable in artificial muscles or micro machines.

BACKGROUND ART

Actuators made of polymers have properties of being light-weighted and flexible as well as inducing no operation noises, and have been expected to be devices of mechanisms for operating artificial muscles or micro devices. Among them, devices adapted to electrochemically expand and contract using conductive polymers such as polypyrrole or polyaniline as driving materials possibly generate energy larger than those by muscles of biological bodies, and have been suggested as polymer actuator devices capable of operating as practical devices. Further, there have been expectations for devices as actuators having larger generation capacity, which employ, as driving materials, conductive polymer materials containing a carbon-based material dispersed therein, such as conductive polymer materials containing carbon nanotubes dispersed therein.

An actuator made of a conductive polymer is operated as follows. By applying a voltage or a current to conductive polymer layers therein to dope the conductive polymer layers with ions from an electrolyte or undope ions from the conductive polymer layers, the conductive polymer layers are expanded or contracted so that the device is driven to be strained.

Further, the electrolyte expansion/contraction mechanism utilizes expansion and contraction induced by electrochemical oxidation reactions and reduction reactions at the time of doping and undoping of the conductive polymer layers. These expansion/contraction phenomena are considered to be caused, along with electrochemical reactions, by the change of the conformation of polymer chains in the conductive polymer, by the expansion and contraction of the conductive polymer layers due to the entrance and exit of ions having a larger volume into and from the conductive polymer layers, or by electrostatic repulsions induced by electric charges of the same type induced in polymer chains.

As an exemplary polymer actuator, it is possible to conceive an actuator having a structure which includes conductive polymer films placed in an electrolytic solution bath for driving the same. Further, as an actuator having a structure different therefrom, there is an actuator disclosed in Patent Document 1. This structure enables placing an active member layer and a counter electrode close to each other using a flexible electrolyte, thereby increasing the effective cross-sectional area of the active member layer which contributes to drive. In this case, the portion which contributes to drive is defined as the active member layer.

FIG. 17A and FIG. 17B are a plan view and a cross-sectional view of a polymer actuator described in Patent Document 1.

The actuator illustrated in FIG. 17A and FIG. 17B includes an active member layer 103 made of a conductive polymer having a rectangular-parallelepiped plate shape and being of a flat-surface thin type, and a flexible electrode 101a made of a metal such as a stainless steel which is provided to be embedded in a substantially-center portion of the active member layer 103 in the thickness direction, wherein the active member layer 103 and the flexible electrode 101a constitute a first electrode layer 101. Second electrode layers 102 having a rectangular plate shape which are made of a metal such as an aluminum foil are placed in the opposite sides with respect to the first electrode layer 101 in the thickness direction, so as to be opposed to and spaced apart from the first electrode layer 101. Further, electrolyte layers 104a are formed so as to contact with the second electrode layers 102 and the active member layer 103 having conductivity. In the above structure, by applying a voltage between the first electrode layer 101 and the second electrode layers 102, the conductive active member layer 103 is caused to expand or contract, thereby causing the actuator to operate. In this case, the electrolyte layers 104a are formed from electrolytes having a value of elasticity modulus of 3 kN/m$^2$ or less, in order not to obstruct the expanding and contracting operations of the active member layer 103.

The actuator is provided, at the respective end portions in the longitudinal direction, with force acting portions 108 as rectangular plate-shaped extending portions from the first electrode layer 101, and is further provided with holes in the pattern-formation sides opposite from the end edges of the force acting portions 108. Pins 107a of loading hooks 107 are inserted in these holes, so that acting forces 108a can certainly act on the loading hooks 107. By applying a voltage between the first electrode layer 101 and the second electrode layers 102 from a power supply 120 using a switch 121, the active member layer 103 is caused to expand or contract in the longitudinal direction, in other words, in the direction of expansion and contraction (namely, the direction of the driving force output from the actuator) 106, thereby causing the actuator to operate.

Further, in order to enclose the electrolyte layers 104 contacting with the active member layer 103 between both the electrode layers 101 and 102, the entire portion other than the force active portions 108 is covered with a flexible sealing member 109 which does not obstruct the movements of the force acting portions 108. With the sealing member 109, it is possible to maintain strength for preventing the electrolyte layers 104 from being moistened or from being damaged by external forces and the like. A flexible silicon-based rubber having a longitudinal elasticity modulus of about 100 kN/m$^2$ is employed as the sealing member 109, thereby achieving a structure which further prevents the expansion and contraction of the active member layer 103 from being obstructed.

Further, there is provided the following structure for preventing the layers from separating from one another, when large strains are induced for performing operations.

Holding members 105a are inserted between the active member layer 103 and the second electrode layers 102, and the second electrode layer 102, the first electrolyte layer 104a, the active member layer 103, the first electrolyte layer 104a, and the second electrode layer 102 are pinched in a lateral direction from the outside by substantially-U shaped clips 105b. The holding members 105a have a function of maintaining the thickness between the active member layer 103 and the second electrode layers 102. This actuator is of a flat-surface thin type, and the clips 105b are each formed from an insulating plastic plate shaped into a clip shape, for example, and are adapted to pinch this actuator to press the holding members 105a.

Further, Patent Document 2 discloses a structure which includes a lubricating electrolyte layer between a conductive film and an electrolyte plate for enabling the conductive film and the electrolyte plate to slide with respect to each other due to the lubricating property exhibited by the material for the lubricating electrolyte layer itself.

Further, Patent Document 3 discloses a structure which includes an actuator film and a counter electrode which are placed in an electrolyte solution and, further, is adapted to apply a voltage between the actuator film and the counter electrode for expanding and contracting the actuator film.

PRIOR ART DOCUMENTS

Patent Documents

Patent Document 1: Japanese Patent No. 3959104
Patent Document 2: Japanese Unexamined Patent Publication No. 2006-246659
Patent Document 3: Japanese Unexamined Patent Publication No. 2006-311630

SUMMARY OF THE INVENTION

Issues to be Resolved by the Invention

In the conventional technique according to Patent Document 4, if the films are subjected to a large force in the direction perpendicular thereto as illustrated in FIG. 17C or the films are bent as illustrated in FIG. 17D, the holding members 105a move within the electrolytes 104a, which may cause the active member layer 103 and the second electrode layers 102 to partially come into contact with each other, thereby degrading the insulation therebetween. If the active member layer 103 and the second electrode layers 102 come into contact with each other, a sufficient voltage cannot act on the electrolytes 104a, which prevents the actuator from normally operating.

Further, while the above description refers to a case where the active member layer 103 and the second electrode layers 102 partially come into contact with each other due to the movement of the holding members 105a, there may be cases where the active member layer 103 and the second electrode layers 102 come into contact with each other since the holding members 105a are embedded in the active member layer 103 or the second electrode layers 102 due to an excessively large force exerting thereon, as illustrated in FIG. 17E.

Further, as illustrated in FIG. 8B in Patent Document 1, two electrolyte layers 4a and 4b are disclosed. These two electrolyte layers 4a and 4b are both made of flexible materials, which makes it hard to prevent the active member layer and the second electrode layers from contacting with each other, with these materials themselves.

Further, in the conventional technique of Patent Document 3, similarly, if the films are subjected to a large force in the direction perpendicular thereto or if the films are bent, the actuator film moves in the electrolyte solution, which may cause the actuator film to partially come into contact with the counter electrode, thereby degrading the insulation therebetween.

On the other hand, in the conventional technique of Patent Document 2, if the conductive film is subjected to a large force in the direction perpendicular thereto or the conductive film is bent, the conductive film may intrude into the lubricating electrolyte layer placed between the conductive film and the electrolyte plate, and in such cases, the lubricating function of the lubricating electrolyte layer is degraded to increase the friction between the conductive film and the electrolyte plate, thereby inducing the problem of difficulty in smoothly moving the conductive film.

Therefore, it is an object of the present invention to overcome the problems described above and to provide a polymer actuator capable of smoothly performing expanding and contracting operations while enhancing the electric insulation between electrode layers.

Means for Resolving the Issues

In order to attain the above object, there is provided the following structures in the present invention.

According to a first aspect of the present invention, there is provided a polymer actuator comprising:
a first electrode layer as a conductive active member layer;
a second electrode layer opposing to the first electrode layer;
an electrolyte layer portion that is placed between the first electrode layer and the second electrode layer and includes a first electrolyte layer and, a second electrolyte layer having a function of maintaining insulation between the first electrode layer and the second electrode layer; and
a plurality of particle-shaped spacers that are placed in the first electrolyte layer, contact with both the first electrode layer and the second electrolyte layer, a part of the spacers being movable relatively to one of the first electrode layer and the second electrolyte layer; wherein
the polymer actuator is driven by a voltage that is applied between the electrode layers.

Effects of the Invention

It is possible to enhance the electric insulation between the electrodes in comparison with conventional actuators, while maintaining a driving ability equivalent to those of conventional actuators.

BRIEF DESCRIPTION OF THE DRAWINGS

These and other aspects and features of the present invention will become clear from the following description taken in conjunction with the preferred embodiments thereof with reference to the accompanying drawings, in which:

FIG. 1A is a plan view schematically illustrating the structure of an actuator according to a first embodiment of the present invention;

FIG. 1C is a cross-sectional view schematically illustrating the structure of an actuator according to another example of the first embodiment;

FIG. 1D is an enlarged cross-sectional view schematically illustrating a portion of the structure of an actuator according to yet another example of the first embodiment;

FIG. 6B is a cross-sectional view schematically illustrating the structure of the actuator according to the modification example of FIG. 6A;

FIG. 7A is a plan view schematically illustrating the structure of an actuator according to a modification example of the first embodiment of the present invention;

FIG. 9B is a cross-sectional view schematically illustrating the structure of the actuator according to the modification example of FIG. 9A;

FIG. 11A is a cross-sectional view schematically illustrating the structure of an actuator according to a third embodiment of the present invention;

FIG. 11B is a cross-sectional view schematically illustrating expanding and contracting operations of the actuator shown in FIG. 11A;

DESCRIPTION OF EMBODIMENTS

Figure 1B:
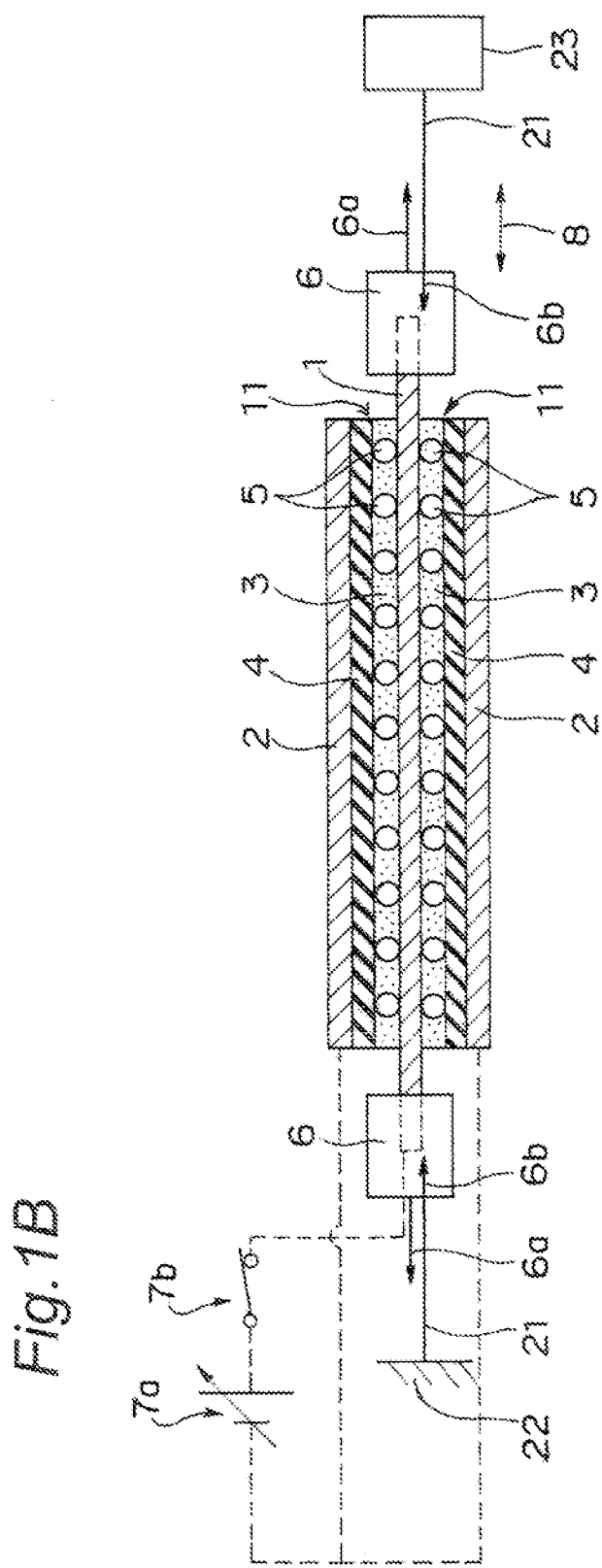
FIG. 1B is a cross-sectional view schematically illustrating the structure of the actuator according to the first embodiment.

Embodiments of the present invention will be described below in detail with reference to the drawings.

Before the detailed description of the embodiments of the present invention with reference to the drawings, there will be described various aspects of the present invention.

According to a first aspect of the present invention, there is provided a polymer actuator comprising:
a first electrode layer as a conductive active member layer;
a second electrode layer opposing to the first electrode layer;
an electrolyte layer portion that is placed between the first electrode layer and the second electrode layer and includes a first electrolyte layer and, a second electrolyte layer having a function of maintaining insulation between the first electrode layer and the second electrode layer; and
a plurality of particle-shaped spacers that are placed in the first electrolyte layer, contact with both the first electrode layer and the second electrolyte layer, a part of the spacers being movable relatively to one of the first electrode layer and the second electrolyte layer; wherein
the polymer actuator is driven by a voltage that is applied between the electrode layers.

According to a second aspect of the present invention, there is provided the polymer actuator according to the first aspect, wherein
the first electrolyte layer is placed at a position in contact with the first electrode layer, and the second electrolyte layer is placed at a position in contact with the first electrolyte layer and in contact with the second electrode layer.

According to a third aspect of the present invention, there is provided the polymer actuator according to the first aspect, wherein
the first electrolyte layer is placed at a position in contact with the second electrode layer, and the second electrolyte layer is placed at a position in contact with the first electrolyte layer and in contact with the first electrode layer.

According to a fourth aspect of the present invention, there is provided the polymer actuator according to the first aspect, wherein
the first electrolyte layer is placed at a position in contact with the first electrode, and the second electrolyte layer is placed at a position in contact with the first electrolyte layer, and
the polymer actuator further comprising between the second electrolyte layer and the second electrode layer, a third electrolyte layer that exerts a function of sliding relatively to the second electrode layer and the second electrolyte layer.

According to a fifth aspect of the present invention, there is provided the polymer actuator according to any one of the first to fourth aspects, wherein
the second electrolyte layer includes an insulation maintaining member having an electrically insulating function and a second electrolyte layer member infiltrated in the insulation maintaining member.

According to a sixth aspect of the present invention, there is provided the polymer actuator according to any one of the first to fifth aspects, wherein
the insulation maintaining member is a separator.

According to a seventh aspect of the present invention, there is provided the polymer actuator according to any one of the first to fifth aspects, wherein
the second electrolyte layer is an ionic liquid.

According to an eighth aspect of the present invention, there is provided the polymer actuator according to any one of the first to sixth aspects, wherein
the second electrolyte layer is a gel impregnated with ions.

According to a ninth aspect of the present invention, there is provided the polymer actuator according to any one of the first to seventh aspects, wherein
the second electrolyte layer is made of an ionic liquid and a gel containing polyvinylidene fluoride.

According to a tenth aspect of the present invention, there is provided the polymer actuator according to any one of the first to ninth aspects, wherein
the first electrolyte layer contains an ionic liquid.

According to an 11th aspect of the present invention, there is provided the polymer actuator according to any one of the first to ninth aspects, wherein
the first electrolyte layer is a gel containing an ionic liquid.

According to a 12th aspect of the present invention, there is provided the polymer actuator according to any one of the first to 11th aspects, further comprising an inter-electrode holding member that is placed between the second electrode layers and constantly maintains a distance between the second electrode layers.

According to a 13th aspect of the present invention, there is provided the polymer actuator according to any one of the first to 12th aspects, further comprising a supporting member that is secured to an outer side of the first electrode layer.

According to a 14th aspect of the present invention, there is provided the polymer actuator according to any one of the first to 13th aspects, wherein each of the particle-shaped spacers has a size from 0.1 to 100 times a thickness of the conductive active member layer.

Hereinafter, description will be given with reference to the drawings, while the present invention is not intended to be restricted to these embodiments.

First Embodiment

There will be described a polymer actuator and a method for controlling the same according to the first embodiment of the present invention.

(Entire Structure)

FIG. 1A and FIG. 1B are a plan view and a cross-sectional view schematically illustrating the structure of the polymer actuator according to the present first embodiment. FIG. 1C is a cross-sectional view schematically illustrating the structure of an actuator according to another example of the first embodiment, and FIG. 1D is an enlarged cross-sectional view schematically illustrating a portion of the structure of an actuator according to yet another example of the first embodiment.

The actuator illustrated in FIG. 1A and FIG. 1B includes a conductive active member layer as a first electrode layer 1, second electrode layers 2 opposing to the first electrode layer, and electrolyte layer portions 11 placed between the first electrode layer 1 and the second electrode layers 2, so that the actuator is driven by applying a voltage between these electrode layers 1 and 2.

The first electrode layer 1 is formed as the active member layer 1 made of a rectangular-shaped film which mainly contains a polymer. Thus, the active member layer 1 has both the function of operating as an actuator and the functions of the first electrode layer.

The second electrode layers 2, which are made of rectangular-shaped films or plate-shaped members, are placed so as to be opposed to and spaced apart from the active member layer 1 on the opposite sides with respect to the active member layer 1 in the thickness direction thereof. The width of the second electrode layers 2 is required to be at least the same as the width of the active member layer 1 in view of efficient operations, but can be set to an arbitrary value equal to or larger than the width of the active member layer 1. The length of the second electrode layers 2 can be arbitrarily set, provided that it is smaller than the length of the active member layer 1.

Figure 3A:
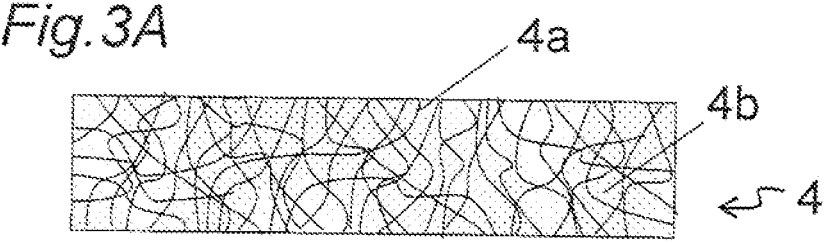
FIG. 3A is a cross-sectional view illustrating an example of a second electrolyte layer in the actuator according to the first embodiment.

The electrolyte layer portions 11 include a first electrolyte layer 3 having a sliding function, and a second electrolyte layer 4 having a function of maintaining the insulation between the active member layer 1 and the second electrolyte layer 2, wherein the first electrolyte layer 3 is capable of exerting the sliding function relatively to the electrode layers 1 and 2 and the second electrolyte layer 4 therebetween. The electrolyte layer portions 11 are preferably formed to have the size same as that of the second electrode layers 2 in view of fabrication. As a concrete structure, the first electrolyte layers 3 having the sliding function are placed at respective positions in contact with the front and rear surfaces of the active member layer 1. Further, the second electrolyte layers 4 having the insulation maintaining function and being capable of allowing ions to move inside thereof are placed at respective positions in contact with the respective first electrolyte layers 3 and the respective second electrode layers 2. In this case, the sliding function of the first electrolyte layers 3 refers to a function of sliding (slipping) relatively to the active member layer 1 and the second electrolyte layers 4 therebetween, in other words, a function of reducing the friction between the active member layer 1 and the second electrolyte layers 4. That is, for example, in cases where the second electrolyte layers 4 are fixed while the active member layer 1 is movable, the first electrolyte layers 3 exert a function of preventing the second electrolyte layers 4 from obstructing the movement of the active member layer 1. On the contrary, for example, in cases where the second electrolyte layers 4 are movable while the active member layer 1 is fixed, the first electrolyte layers 3 exert a function of preventing the active member layer 1 from obstructing the movements of the second electrolyte layers 4. Further, the insulation maintaining function of the second electrolyte layers 4 refers to a function of maintaining the distance between the front and rear surfaces of the second electrolyte layers 4 at a certain size or more by the elasticity and the insulation of the second electrolyte layers 4 for maintaining the electric insulation between the front and rear surfaces of the second electrolyte layers 4 (in other words, between the members contacting with the front surface and the rear surface of the second electrolyte layers 4), if the actuator is subjected to an external force or the actuator is deformed by being driven. In this case, the term "electric insulation" refers to a property of exhibiting no electron conductivity. The second electrolyte layers 4 have ion conductivity for transmitting electricity through the movements of ions therein, but have no electron conductivity for transmitting electricity due to the movements of electrons. As illustrated in FIG. 3A, the second electrolyte layers 4 are constituted by an insulation maintaining member 4a such as a nonwoven fabric which is placed to contact with the first electrolyte layer 3 and the second electrode layer 2, and a second electrolyte layer member 4b existing in such a way as to be infiltrated into the insulation maintaining member 4a. The insulation maintaining member 4a has the function of maintaining the distance between the front and rear surfaces thereof at a certain size or more by the elasticity of the insulation maintaining member 4a so as to maintain the electric insulation therebetween, if the actuator is subjected to an external force or the actuator is deformed by being driven. Further, the second electrolyte layer member 4b infiltrated into the insulation maintaining member 4a is capable of allowing ions to move inside thereof. The insulation maintaining member 4a and the second electrolyte layer member 4b function integrally with each other as the second electrolyte layer 4. Between the active member layer 1 and the second electrolyte layers 4, as illustrated in FIGS. 1B to 1D, there are placed a large number of particulate spacers 5 which contact with both the active member layer 1 and the second electrolyte layers 4, a part of the spacers 5 can move relatively to the active member layer 1 or the second electrolyte layers 4. Namely, the spacers 5, which exist in such a way as to be mixed in the first electrolyte layers 3, have a function of constantly maintaining the thickness between the active member layer 1 and the second electrode layers 2 and further have a function of smoothly maintaining the expanding and contracting operations of the active member layer 1. FIG. 1C generally illustrates a state where the large number of particulate spacers 5 are contained in the first electrolyte layers 3, and FIG. 1D is a view of an example indicating that the large number of particulate spacers 5 may be in a state where some of them contact with only any one of the active member layer 1 and the second electrolyte layers 4, rather than all the spacers 5 contact with both the active member layer 1 and the second electrolyte layers 4. In this example, the spacers 5 in contact with both the active member layer 1 and the second electrolyte layers 4 have the function of constantly maintaining the thickness between the active member layer 1 and the second electrolyte layers 2 and also have the function of smoothly maintaining the expanding and contracting operations of the active member layer 1.

The detailed structures and the like of the respective layers in the actuator will be described later.

The actuator is provided at the respective end portions in the longitudinal direction thereof with force acting portions 6 as rectangular plate-shaped extending portions from the active member layer 1. As an example, one of the force acting portions 6 (for example, the left force acting portion 6 in FIG. 1B) can be secured to a fixed wall 22 by a string-shaped member 21 being at a tension state and also being capable of transferring forces, while the other force acting portion 6 (for example, the right force acting portion 6 in FIG. 1B) can be adapted to drive a driven member 23 with the actuator through a string-shaped member 21 being at a tension state and also being capable of transmitting forces. Upon receiving a force 6a from the outside of the actuator, each force acting portion 6 applies, as a reaction thereto, a force against the outside (in other words, a force of pulling the external driven member 23 due to expansion or contraction) 6b onto the point of action of the string-shaped member 21. Further, as will be described later, this actuator can also have a contact maintaining portion having a function of maintaining the layers in contact with one another (which is not illustrated in FIG. 1A and FIG. 1B and details of which will be described later).

Further, referring to FIG. 1B, there are placed a variable direct-current power supply 7a and a switch 7b between the active member layer 1 and the second electrode layers 2.

In this structure, by closing the switch 7b and applying a positive voltage or a negative voltage from the variable direct-current power supply 7a between the active member layer 1 and the second electrode layers 2, the active member layer 1 expands or contracts in the longitudinal direction thereof, in other words, in the direction of expansion or contraction thereof (namely, in the direction of the driving force output from the actuator) 8, which causes the actuator to operate for driving the driven member 23 with respect to the fixed wall 22, for example.

Figure 2:
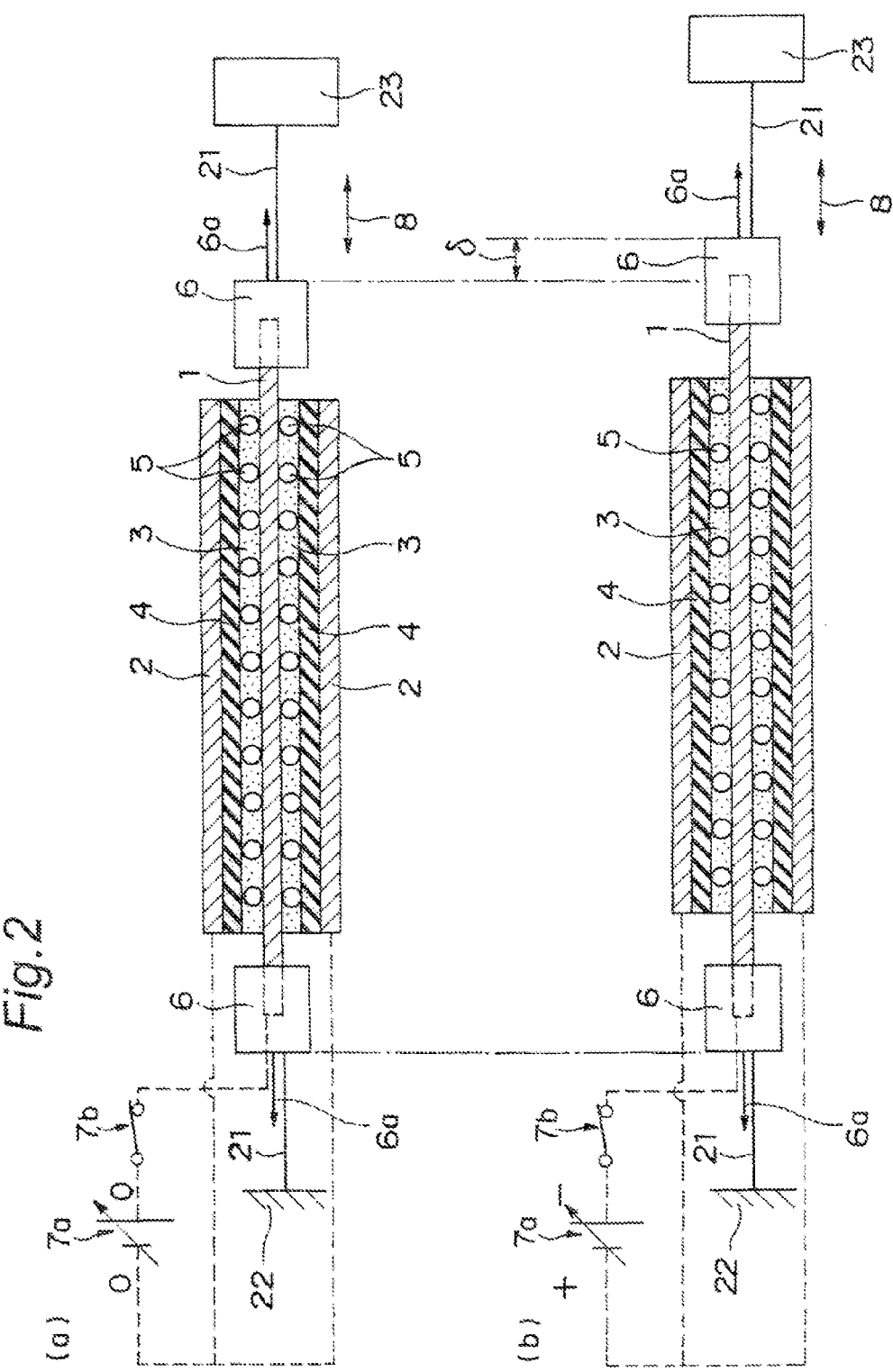
FIG. 2 is a cross-sectional view illustrating expanding and contracting operations of the actuator according to the first embodiment.

FIG. 2 is a view illustrating a state where the actuator performs an expanding or contracting operation. In an upper view (a) in FIG. 2, the switch 7b is closed and the power-supply voltage from the variable direct-current power supply 7a is zero, while in a lower view (b) in FIG. 2, the switch 7b is closed and a negative voltage is applied from the variable direct-current power supply 7a to the active member layer 1 with respect to the second electrode layers 2. As a result, in the view (b) in FIG. 2, the active member layer 1 is expanded by a size of δ in comparison with the view (a) in FIG. 2, as indicated by a dashed line. In FIG. 2, the force acting portion 6 at the left end is fixed at the left end edge thereof, while the position of the right end edge of the force acting portion 6 at the right end is mutually referred, in order to clearly indicate that, in the view (b) FIG. 2, there is the expansion by the size δ in comparison with the view (a) in FIG. 2. In this actuator, the second electrolyte layers 4 and the active member layer 1 can slide with respect to each other with small friction therebetween through the first electrolyte layers 3 and the spacers 5, which enables the active member layer 1 to effectively perform expanding and contracting operations.

Further, in FIG. 2, wiring is illustrated by dotted lines. Further, in FIG. 2, the wiring is exemplarily illustrated as being connected to the active member layer 1 and the second electrode layers 2 at their left sides, but the points of connections thereof are arbitrarily located, and plural points of connections can be provided for each of the active member layer 1 and the second electrode layers 2. For example, wiring can be connected to the opposite ends of each of the active member layer 1 and the second electrode layers 2. In this structure, it is possible to suppress the voltage drop due to the electric resistance in each of the layers 1 and 2, which can reduce the energy loss due to Joule heat in these portions.

(The Principle of Driving of the Actuator)

The expansion and contraction of the active member layer 1 are induced by entrance and exit of ion species or electrons contained in the electrolytes into and from the conductive polymer layer which forms the active member layer 1. These expansion and contraction are induced by various causes depending on the material for the active member layer 1, and the mechanism of the deformation thereof is considered to be as follows. In cases where the active member layer 1 is made of a conductive polymer, ion species have a certain volume, and therefore, the entrance and exit of ion species along with doping and undoping thereof also change the volume of the conductive polymer. Further, the conformation of the polymer chain structure of the conductive polymer is changed along with oxidation-reduction reactions. Moreover, electric charges of the same type are injected by the voltage application to cause electrostatic repulsion. Also in cases where the active member layer 1 is made of a conductive polymer of a polymer material containing carbon-based particles, the deformation thereof is considered to be caused by entrance and exit of ion species and electrostatic repulsion caused by electric charges of the same type, although the expansion and contraction thereof involve no oxidation-reduction reaction as described above. Thus, the active member layer 1 is expanded and contracted along with the entrance and exit of ion species by the same mechanism as that of cases where the active member layer 1 is made of a conductive polymer.

When the actuator is regarded as an electrochemical system, the active member layer 1 is considered to operate as a working electrode while the second electrode layers 2 are considered to operate as counter electrodes.

(Detailed Description of the Active Member Layer 1)

The active member layer 1 can be made of a conductive polymer, such as polyaniline-based, polypyrrole-based, or polythiophene-based n-conjugated polymer or a derivative thereof. Further, the active member layer 1 can be formed as a conductive member containing at least a material selected out of carbon-based particles, metal-based particles, metal-oxide particles, carbon nanofibers, and carbon nanotubes. By forming the active member layer 1 using any one of these materials, it is possible to cause anions, cations, and/or electrons to enter and exit the active member layer 1, thereby expanding and contracting the active member layer 1. The rigidity of the active member layer 1 of a conductive-particle-dispersed type can be adjusted by selecting the conditions for polymerization of the polymer which forms the binder, such as polyvinylidene difluoride. In order to generate large forces from the active member layer 1, it is more preferable to adjust to have an elasticity modulus of about 3 $GN/m^2$, which is close to the rigidity of polypyrrole as a conductive polymer described above.

Particularly, as the material for the active member layer 1, it is possible to employ the following conductive polymer film. Examples of the conductive polymer film include polypyrrole and polypyrrole derivatives, polyaniline and polyaniline derivatives, polythiophene and polythiophene derivatives, or (co)polymers made of one or more types of materials selected out of the above. Particularly, it is preferable to employ polypyrrole, polythiophene, poly(N-methyl pyrrole), poly(3-methylthiophene), poly(3-methoxythiophene), poly (3,4-ethylenedioxythiophene), or (co)polymers made of one or two types of materials selected out of the above. These conductive polymer films are used in states of being doped with negative ions (anions) such as hexafluorophosphate ions ($PF_6^-$) p-phenolsulfonic acid ions (PPS), dodecylbenzene-sulfonic acid ions (DBS), or polystyrene sulfonic acid ions (PSS). In this state, the conductive polymer films exhibit conductivity and exert functions of a polymer actuator. These films can be formed by performing synthesis through chemical polymerization or electrolytic polymerization, and thereafter performing thereon shaping processing as required.

Next, the thickness of the active member layer 1 will be described. In cases where the active member layer 1 has a larger thickness, it is possible to generate larger forces in works through electrolytic expansion and contraction of the polymer actuator. On the other hand, in cases where the active member layer 1 has a smaller thickness, it is possible to cause the actuator to operate at a higher speed, since ions can enter and exit the active member layer 1. It is desirable to design the thickness of the active member layer 1 in consideration of these facts. The value of the thickness of the active member layer 1 desirably falls within the range of about 100 nm to 1 mm, and more desirably falls within the range of 1 μm to 100 μm. If the thickness of the active member layer 1 is larger than 1 mm, entrance and exit of ions into and from the active member layer 1 occur excessively slowly. On the contrary, if the thickness of the active member layer 1 is smaller than 100 nm, excessively smaller forces is generated by works through electrolytic expansion and contraction of the polymer actuator. The reason why the thickness of the active member layer 1 particularly desirably, falls within the range of 1 μm to 100 μm is as follows. If the film thickness thereof is smaller than 1 μm, it may be difficult to handle the film during fabrication or may degrade the uniformity in the film thickness. Therefore, it is particularly desirable that the film thickness is 1 μm or more. On the other hand, if the film thickness thereof exceeds 100 μm, the time required for forming the film by electrolytic polymerization may be significantly longer. Therefore, it is particularly desirable that the film thickness thereof is 100 μm or less. The active member layer 1 can be formed by applying a solution or a dispersion liquid, to a substrate. Also in this case, if the film thickness thereof exceeds 100 μm, the time required for drying the film may possibly be longer. Therefore, it is particularly desirable that the film thickness thereof is 100 μm or less.

(Detailed Description of the Second Electrode Layers 2)

As an example of the second electrode layers 2, it is possible to employ conductive polymer films. As such conductive polymer films, it is possible to employ films similar to those for the active member layer 1, such as polypyrrole films. As another example of the second electrode layers 2, it is possible to employ platinum mesh films. Further, as yet another example of the second electrode layers 2, it is possible to exemplify films made of a mixture of a polymer and a carbon material such as carbon nanotubes or activated carbon. By employing one of the above materials as the second electrode layers 2, it is possible to preferably have flexibility, high electric conductivity, a large surface area, and a large electric capacity.

(Detailed Description of the First Electrolyte Layers 3)

The first electrolyte layers 3 are made of a liquid electrolyte (an electrolytic solution) or a solid electrolyte. In this case, such a liquid electrolyte is a liquid-type electrolyte, and it is possible to employ an electrically-conductive solution obtained by dissolving an ionic material in a polar solvent such as water or a liquid made of ions (an ionic liquid). As the electrolytic solution, it is possible to employ solutions obtained by dissolving an electrolyte such as $NaPF_6$, $TBAPF_6$, HCl, or NaCl in water or an organic solvent such as propylene carbonate. Alternatively, it is possible to employ ionic liquids such as $BMIPF_6$ or EMI-TFSI. As the solid electrolytes, it is possible to employ electrolytes obtained by gelling the above electrolytic solutions, such as polymer gels, particularly. A polymer gel forms a three-dimensional mesh structure with polymer bridges and is swelled by absorbing a solvent inside thereof. Such a polymer gel exhibits intermediate characteristics between a solid and a liquid. Further, polymer gels can be categorized into "physical gels" and "chemical gels", depending on the difference in bridging method. Physical gels have bridges obtained by hydrogen bonds, ion bonds, or coordinate bonds, while chemical gels have bridges obtained by covalent bonds through chemical reactions.

As a chemical gel, it is possible to exemplify one obtained by adding ethylene glycol dimethacrylate (EDGMA) as a bridging agent to a solution of mixture of methyl methacrylate (MMA) as a monomer and ethyl-methylimidazolium-trifluoromethane-sulfonylimide (EMI-TFSI) as an ionic liquid, and then performing heating polymerization thereon. Such a polymer electrolyte gel is a solid polymer which contains PMMA as a mesh polymer uniformly dissolved in an ionic liquid and thus exhibits ion conductivity even after the polymerization. Further, by changing the mixing ratio between the PMMA and the ionic liquid, it is possible to adjust the elasticity modulus.

As an exemplary physical gel, it is possible to conceive a polymer gel made of a mixture of an ionic liquid and an organic polymer containing at least one out of vinylidene-fluoride-hexafluoropropyl ene copolymer [P(VDF/HFP)], polyvinylidene difluoride (PVDF), perfluorosulfonic-acid/PTFE copolymer, polymethyl methacrylate (PMMA), polyethylene oxide (PEO), and polyacrylonitrile (PAN).

The first electrolyte layers 3 are made of a material having a sliding function, and are desirably made of a liquid or a flexible polymer gel. As the first electrolyte layers 3, it is particularly desirable to employ an ionic liquid having excellent sliding performance, such as EMI-TFSI, EMI-BF$_4$, HEI-BF$_4$, EMI-PF$_6$, HEI-PF$_6$, or HEI-TFSI. Further, as the first electrolyte layers 3, it is desirable to employ polymer gels containing the above ionic liquids, since they also have excellent slidability. In cases where the first electrolyte layers 3 are made of a polymer gel which is a physical gel, it is desirable that the mixing ratio of the ionic liquid is 90% or more in view of the slidability.

Further, in cases where the first electrolyte layers 3 are made of a solid electrolyte, it is desirable to employ a solid electrolyte having flexibility in view of the sliding function.

(Detailed Description of the Second Electrolyte Layers 4)

The second electrolyte layers 4 are each constituted by the insulation maintaining member 4a and the second electrolyte layer member 4b as described above, and hereinafter, the insulation maintaining member 4a and the second electrolyte layer member 4b will be described in detail.

As an example of the insulation maintaining member 4a, it is possible to conceive a capacitor-intended separator. As an example of the capacitor-intended separator, it is possible to conceive a polyolefin microporous film, and it is possible to employ a polyolefin microporous film having a film thickness in the range of 40 μm to 110 μm, for example. This is a flat-type polyethylene film having a large number of fine holes (submicron) with a high cavity rate. Further, as another example of the insulation maintaining member 4a, it is possible to conceive a capacitor-intended separator, such as a paper-based separator made of a cellulose or a nonwoven-fabric-based separator made of a polypropylene, and it is possible to employ such a capacitor-intended separator having a film thickness in the range of 30 to 300 μm, for example. In this case, a "separator" is defined as a film having a function of maintaining electrical insulation.

The second electrolyte layer member 4b is made of a liquid electrolyte (an electrolytic solution) or a solid electrolyte. As the second electrolyte layer member 4b, it is possible to employ one similar to the first electrolyte layers 3. However, in the present first embodiment, the first electrolyte layers 3 preferably have flexibility in view of the sliding function, but the second electrolyte layer member 4b can have hardness or an elasticity modulus of an arbitrary magnitude, since it is not particularly required to have a sliding function.

The second electrolyte layers 4 have the function of maintaining the distance between the front and rear surfaces of the second electrolyte layers 4 at a certain length or more by the elasticity of the second electrolyte layers 4 for maintaining the insulation between these front and rear surfaces (the insulation maintaining function), when the actuator is subjected to an external force or the actuator is deformed by being driven. In order to attain this function, the insulation maintaining members 4a are required to have an elasticity modulus larger than 3 kN/m$^2$. As described above, a gel material having an elasticity modulus of 3 kN/m$^2$ or less has flexibility substantially equivalent to those of gels to be easily scooped by a spoon, and it is difficult to employ such a material alone for preventing the active member layer 1 and the second electrode layers 2 from contacting with each other.

FIG. 3A schematically illustrates a state where the second electrolyte layer 4 is constituted by the insulation maintaining member 4a and the second electrolyte layer member 4b made of an ionic liquid. In this example, the insulation maintaining member 4a is a capacitor-intended separator and the second electrolyte layer member 4b is made of an ionic liquid, for example. That is, the second electrolyte layer 4 is constituted by a separator impregnated with an ionic liquid, for example.

(Detailed Description of the Spacers 5)

The spacers 5 are insulating or conductive particles which are placed in the first electrolyte layers 3 and have both the function of maintaining the distance between the active member layer 1 and the second electrolyte layers 4 at a certain length or more and the function of smoothly maintaining the expanding and contracting operations of the active member layer 1. The spacers 5 may exist within the first electrolyte layers 3 in such a way as to adhere and be secured to the active member layer 1 and one of the second electrolyte layers 4 while not adhering and being secured to the other of them (see FIGS. 4A to F, which will be described later). Also, the spacers 5 may exist within the first electrolyte layers 3 in such a way as not to adhere and be secured to any of the active member layer 1 and the second electrolyte layers 4 (see FIGS. 4G to H, which will be described later). It is preferable to form the spacers 5 using a material which produces small friction with the surface of the active member layer 1 or the second electrolyte layers 4, so as to prevent the spacers 5 from obstructing the strain induced in the active member layer 1. As an example thereof, it is possible to conceive spacers made of Teflon (registered trademark). As another example of the spacers 5, it is possible to conceive transparent spherical-shaped plastic particles. As such plastic particles, it is possible to employ LCD-intended spacers or particles for use as gap members in semiconductor packages, automobile parts, or optical parts. The diameters of plastic particles may be set to be arbitrary values within the range of 1 to 1000 μm, for example, and it is preferable to substantially uniformly place the particles having substantially the same diameter values. The spacers 5 can have an arbitrary shape, but it is preferable that the spacers 5 have a spherical shape, for example, since such a shape makes the contact area smaller between the spacers 5 and the active member layer 1 or between the spacers 5 and the second electrolyte layers 4, thereby reducing the friction therebetween. The material for the spacers 5 may be either conductive or insulating.

The size of the spacers 5 is particularly preferably within the range from 0.1 to 100 times the thickness of the active member layer 1. If the size of the spacers 5 is less than 0.1 time the thickness of the active member layer 1, the spacers 5 are completely embedded in the active member layer 1 during operations and cannot sufficiently exert the sliding function. On the other hand, if the size of the spacers 5 is larger than 100 times the thickness of the active member layer 1, the distance between the electrodes is made larger and also the volumes of the spacers 5 are made larger, which increases the electric resistance involved in ion conduction to induce the problem of reduction of the actuator operation efficiency, as well as increases the size of the actuator to induce the problem of reduction of the amount of work per unit volume.

Figure 4A:
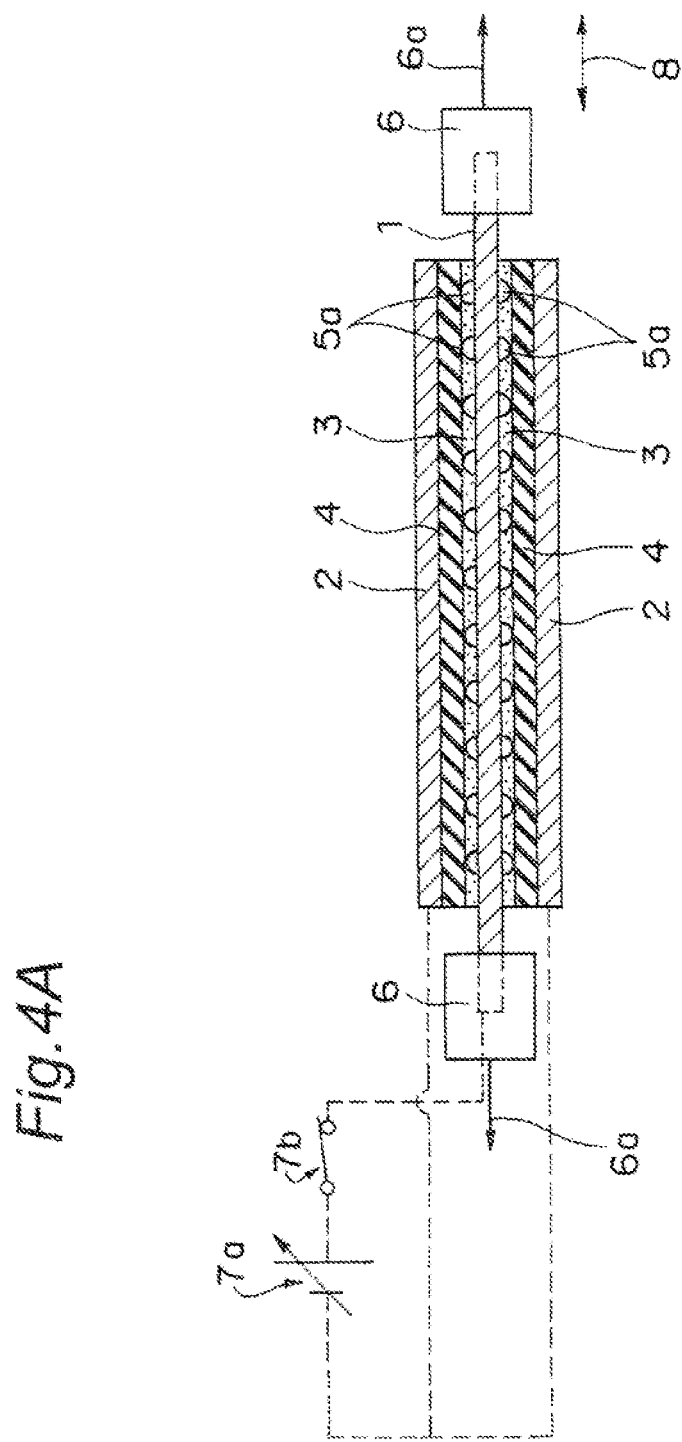
FIG. 4A is a cross-sectional view schematically illustrating the structure of an actuator according to a first modification example of the first embodiment.
Figure 4B:
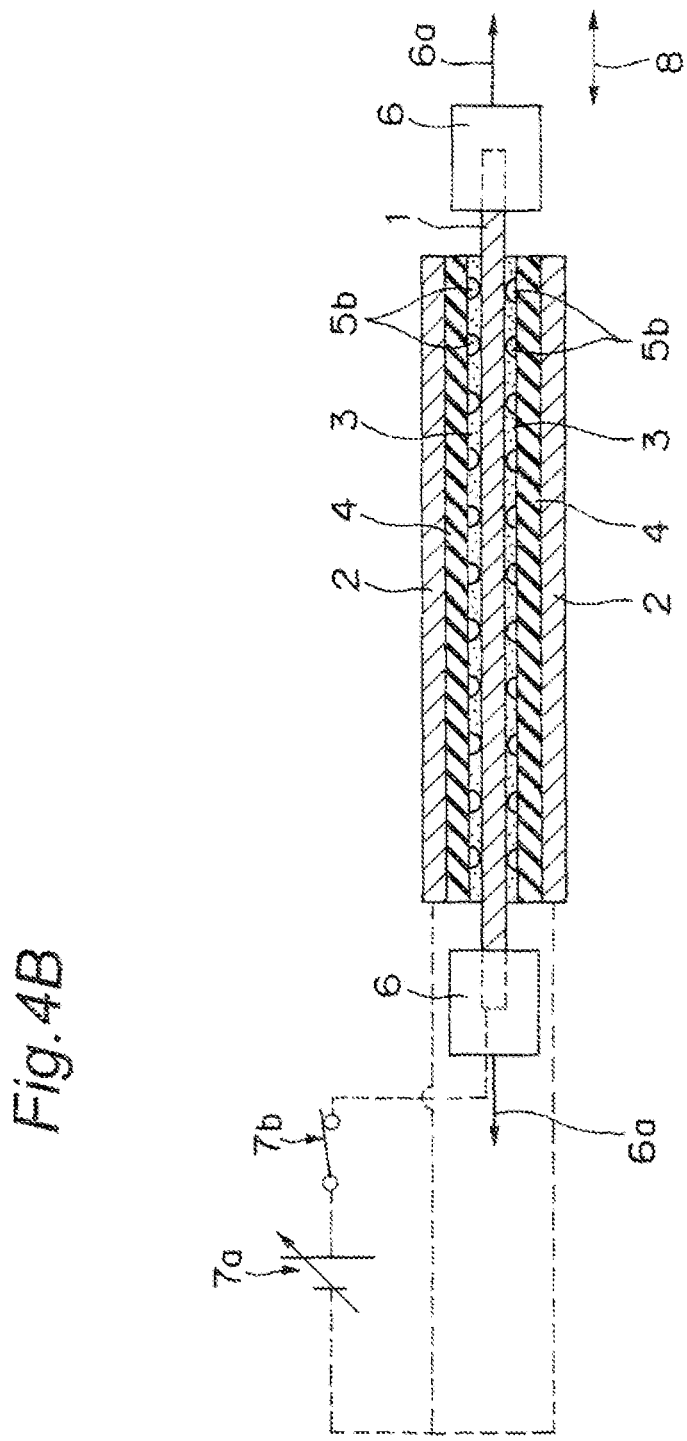
FIG. 4B is a cross-sectional view schematically illustrating the structure of an actuator according to a second modification example of the first embodiment.

FIG. 4A and FIG. 4B illustrate two examples in which the spacers 5 are formed by plastic particles 5a and 5b having semi-spherical shapes, respectively.

In FIG. 4A, flat surface portions of a large number of semi-spherical-shaped plastic particles 5a, as the spacers 5, adhere to the front surface and the rear surface of the active member layer 1, while spherical surface portions of the large number of semi-spherical-shaped plastic particles 5a as the spacers 5 do not adhere to the second electrolyte layers 4. In this case, it is possible to make the contact area smaller between the spacers 5a and the second electrolyte layers 4, which can reduce the friction therebetween and also can certainly and easily form a structure for uniformly placing the large number of spacers 5a.

In FIG. 4B, the spherical surface portions of the large number of semi-spherical-shaped plastic particles 5a as the spacers 5 do not adhere to the active member layer 1, while flat surface portions of a large number of semi-spherical-shaped plastic particles 5b as the spacers 5 adhere to the second electrolyte layers 4. In this case, it is possible to make the contact area smaller between the spacers 5b and the active member layer 1, which can reduce the friction therebetween and also can certainly and easily form a structure for uniformly placing the large number of spacers 5b.

Further, FIGS. 4C to 4H illustrate modification examples in which the spacers 5 in the first electrolyte layers 3 are formed by spherical-shaped plastic particles 5c.

Figure 4C:
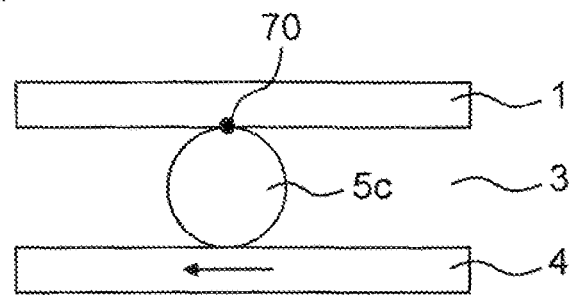
FIG. 4C is a cross-sectional view schematically illustrating the structure of an actuator according to a third modification example of the first embodiment.
Figure 4D:
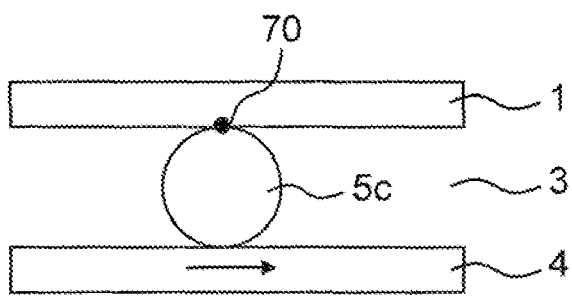
FIG. 4D is another cross-sectional view schematically illustrating the structure of the actuator according to the third modification example of the first embodiment.

In FIG. 4C and FIG. 4D, each particle-shaped spacer 5c placed between the active member layer 1 and one of the second electrolyte layers 4 is placed such that it contacts with both the active member layer 1 and the second electrolyte layer 4 and also is partially fixed at a fixed portion 70 to the active member layer 1 while being movable relatively to the second electrolyte layer 4. As the way of fixing at the fixed portion 70, it is possible to exemplify fixture through adhesion or the like. FIG. 4C illustrates a state where the second electrolyte layer 4 can move in the leftward direction with respect to the spacer 5c. On the contrary, FIG. 4D illustrates a state where the second electrolyte layer 4 can move in the rightward direction with respect to the spacer 5c.

Figure 4E:
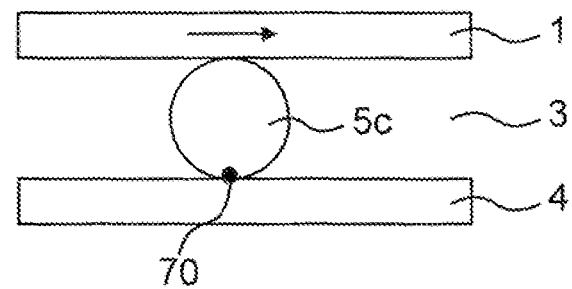
FIG. 4E is a cross-sectional view schematically illustrating the structure of an actuator according to a fourth modification example of the first embodiment.
Figure 4F:
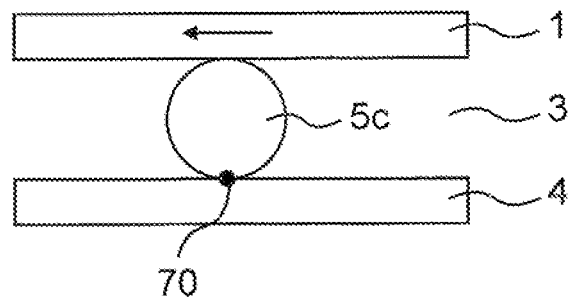
FIG. 4F is another cross-sectional view schematically illustrating the structure of the actuator according to the fourth modification example of the first embodiment.

In FIG. 4E and FIG. 4F, each particle-shaped spacer 5c placed between the active member layer 1 and the second electrolyte layer 4 is placed such that it contacts with both the active member layer 1 and the second electrolyte layer 4 and also is partially fixed at the fixed portion 70 to the second electrolyte layer 4 while being movable relatively to the active member layer 1. As the way of fixing at the fixed portion 70, it is possible to exemplify fixture through adhesion or the like. FIG. 4E illustrates a state where the active member layer 1 can move in the rightward direction with respect to the spacer 5c. On the contrary, FIG. 4F illustrates a state where the active member layer 1 can move in the leftward direction with respect to the spacer 5c.

Figure 4G:
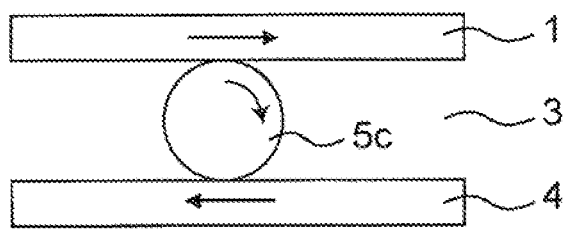
FIG. 4G is a cross-sectional view schematically illustrating the structure of an actuator according to a fifth modification example of the first embodiment.
Figure 4H:
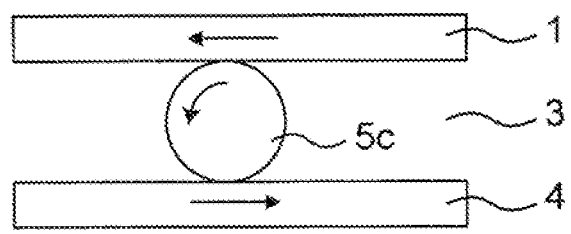
FIG. 4H is another cross-sectional view schematically illustrating the structure of the actuator according to the fifth modification example of the first embodiment.

In FIG. 4G and FIG. 4H, each particle-shaped spacer 5c placed between the active member layer 1 and the second electrolyte layer 4 is placed such that it contacts with both the active member layer 1 and the second electrolyte layer 4 and also is movable relatively to the active member layer 1 or the second electrolyte layer 4, without being provided with a fixed portion 70. FIG. 4G illustrates a state where the active member layer 1 moves in the rightward direction and also the second electrolyte layer 4 moves in the leftward direction with respect to the spacer 5c. In this case, the spacer 5c is caused to rotate in the rightward direction (in the clockwise direction). On the contrary, FIG. 4H illustrates a state where the active member layer 1 moves in the leftward direction and also the second electrolyte layer 4 moves in the rightward direction with respect to the spacer 5c. In this case, the spacer 5c is caused to rotate in the leftward direction (in the counterclockwise direction).

Further, in some cases, the spacers 5c may slide partially relatively to the active member layer 1 or the second electrolyte layers 4, since the spacers 5c have a particle shape.

(Description of Other Portions)

As an example of the contact maintaining portion having a function of maintaining the contact between the respective layers in the actuator, it is possible to conceive a method of integrally pinching in the widthwise direction of the actuator with a clip having a substantially-U shape, from the outside of the actuator, the first electrolyte layers 3, the second electrolyte layers 4, and the second electrode layers 2, which are placed near the front and rear sides of the active member layer 1 with the active member layer 1 centered. This actuator is of a flat-surface thin type, and this clip is formed by an insulating plastic plate having a clip shape, for example, and is adapted to pinch this actuator therebetween for pressing the respective layers. Further, as another example of the contact maintaining portion, it is possible to conceive a container with rigidity high enough to contain the respective layers therein. Further, as yet another example of the contact maintaining portion, it is possible to conceive a bag-type member having elasticity enough to contain the respective layers therein. In this case, the entire actuator can be made to have a property of being flexible and deformable into arbitrary shapes. In any of these cases, it is necessary to prevent the clip, the container, or the bag-type member from obstructing at least the expansion and contraction operations of the active member layer 1.

Figure 5:
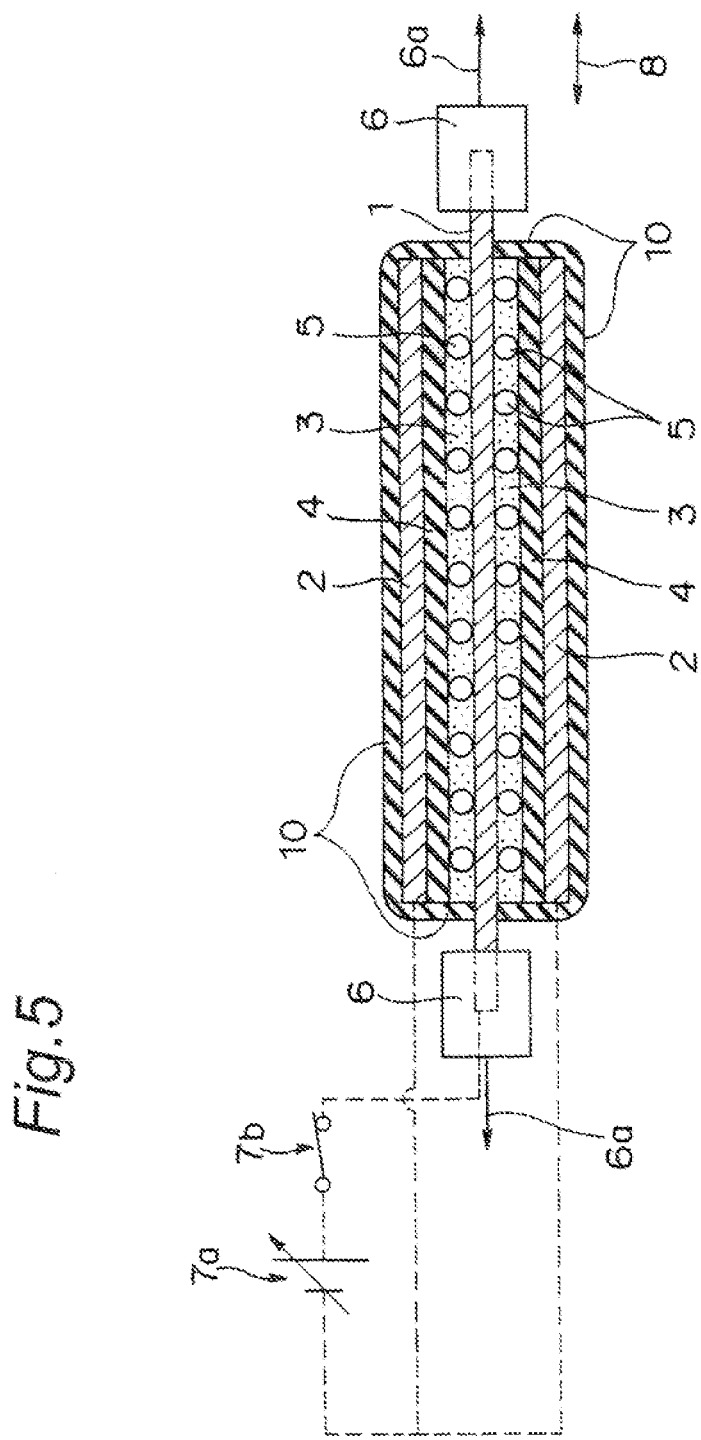
FIG. 5 is a cross-sectional view schematically illustrating the structure of an actuator according to yet another modification example of the first embodiment.

Further, as illustrated in FIG. 5, in order to certainly enclose the electrolyte layer portions 11 between both the electrode layers 1 and 2, it is possible to provide a structure in which the entire actuator other than the active member layer 1 and the force acting portions 6 is covered with a flexible insulating sealing member 10 not obstructing the movements of the active member layer 1 and the force acting portions 6. With the sealing member 10, it is possible to ensure strength for preventing the electrolyte layer portions 11 from being moistened or for preventing the electrolyte layer portions 11 and the like from being damaged by external forces. As the sealing member 10, it is possible to employ a flexible silicon-based rubber with a longitudinal elasticity modulus of about 100 kN/m$^2$ for providing a structure which further prevents the expansion and contraction of the active member layer 1 from being obstructed. Further, the sealing member 10 can also have the functions of the contact maintaining portion, due to its elasticity. FIG. 5 illustrates an exemplary structure of the actuator according to the present embodiment including the sealing member 10 which further has the functions of the contact maintaining portion.

(Examples of Modifications)

Figure 6A:
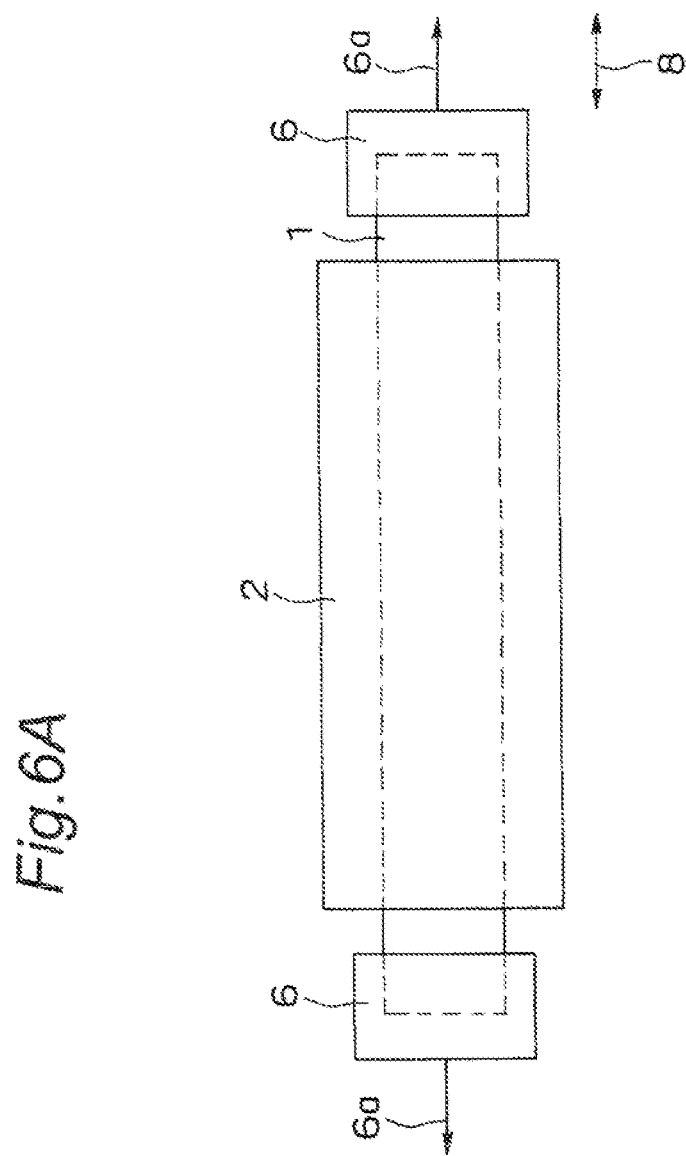
FIG. 6A is a plan view schematically illustrating the structure of an actuator according to a modification example of the first embodiment of the present invention.
Figure 7B:
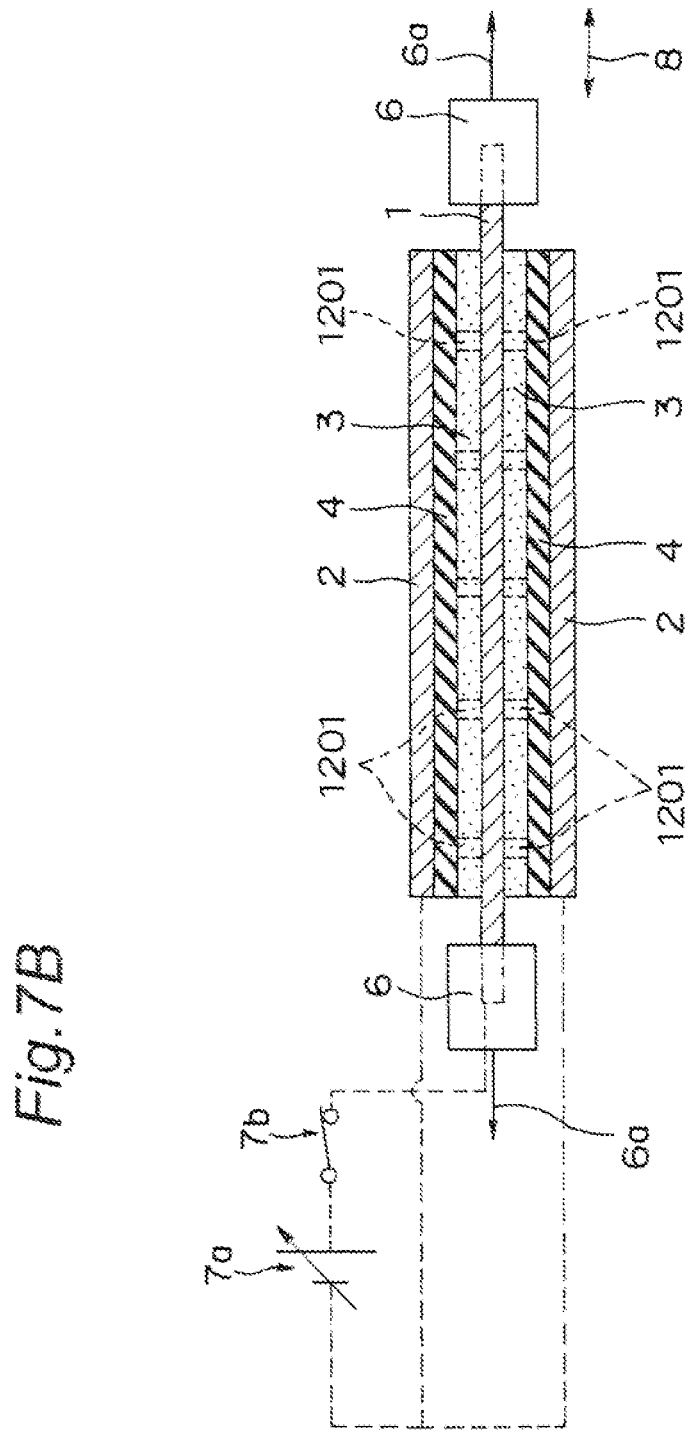
FIG. 7B is a cross-sectional view schematically illustrating the structure of the actuator according to the modification example of FIG. 7A.

While, in the above description, there has been described a structure in which the spacers 5 are placed between the active member layer 1 and the second electrolyte layers 4, it is also possible to provide a structure which includes no spacer 5 as illustrated in FIG. 6A and FIG. 6B. In this case, in order to reduce the friction between the active member layer 1 and the second electrolyte layers 4, it is desirable to employ an ionic liquid or a polymer gel containing an ionic liquid, as the first electrolyte layers 3. Particularly in the case of employing such a polymer gel, it is desirably possible to eliminate or simplify the sealing structure for preventing the leakage of the electrolyte to the outside. Further, as illustrated in FIG. 7A and FIG. 7B, it is also possible to employ inter-electrode holding members 1201 having a rectangular prism shape, for example, in order to maintain a constant distance between the two second electrode layers 2 at the upper and lower positions. In this case, it is possible to conceive structuring the inter-electrode holding members 1201 to adhere to the two second electrode layers 2 at the upper and lower positions, for example. The inter-electrode holding members 1201 are preferably made of the material same as that of the second electrolyte layers 4. The inter-electrode holding members 1201 are placed to maintain the distance between the second electrode layers 2 in areas other than the area where the active member layer 1 is placed, in order not to obstruct the movement of the active member layer 1. Alternatively, the inter-electrode holding members 1201 can be placed between the second electrolyte layers 4, rather than being placed between the second electrode layers 2, which can also provide the same effects.

Further, in each actuator, it is also possible to employ an ionic liquid gel, instead of a liquid electrolyte (an electrolytic solution) or a solid electrolyte, as the second electrolyte layer members 4b. In this case, the second electrolyte layers 4 are constituted by the insulation maintaining member 4a and the second electrolyte layer member 4b made of such an ionic liquid gel.

Figure 3B:
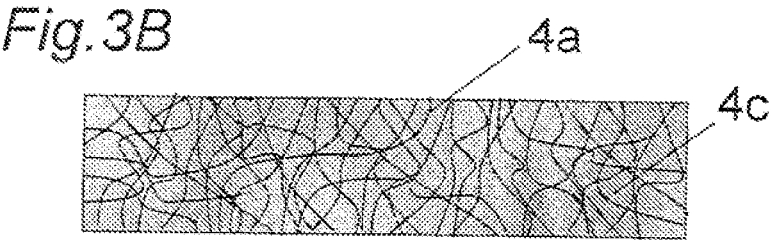
FIG. 3B is a cross-sectional view illustrating another example of a second electrolyte layer in the actuator according to the first embodiment.

The second electrolyte layers 4 made of such an ionic liquid gel can be fabricated according to the following method, for example. First, a capacitor-intended separator (corresponding to the insulation maintaining member 4a) which has been cut into an appropriate size is placed inside a metal die and then a mixture of an ionic liquid (EMI-TFSI) and PVDF/HFP (KYNAR FLEX 2500) (registered trademark) at 8:2 is added from thereabove. Thereafter, the above is gelled by heating at 100° C. for 45 minutes and then the frame is removed therefrom to form an ionic liquid gel having a predetermined shape. FIG. 3B schematically illustrates a state where the second electrolyte layers 4 are constituted by the insulation maintaining member 4a made of a separator and the second electrolyte layer member 4c made of an ionic liquid gel. In this example, the insulation maintaining member 4a is formed by a capacitor-intended separator, and the second electrolyte layer member 4c is made of an ionic liquid gel.

Figure 3C:
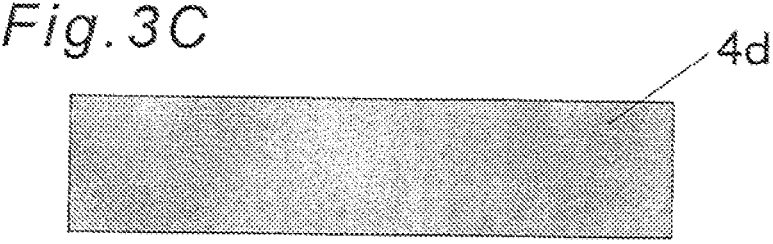
FIG. 3C is a cross-sectional view illustrating yet another example of a second electrolyte layer in the actuator according to the first embodiment.

Alternatively, as illustrated in FIG. 3C, the second electrolyte layers 4 can be made of only an ionic liquid gel 4d. Such an ionic liquid gel can be fabricated according to the following method, for example. First, a mixture of an ionic liquid (EMI-TFSI) and PVDF/HFP (KYNAR FLEX 2500) (registered trademark) at 8:2 is provided into a metal die. Thereafter, the above is gelled by heating at 100° C. for 45 minutes and then the frame is removed therefrom to form an ionic liquid gel having a predetermined shape. FIG. 3C schematically illustrates a state where the second electrolyte layers 4 are constituted only by such an ionic liquid gel 4d, without being provided with the insulation maintaining member 4a.

Figure 8:
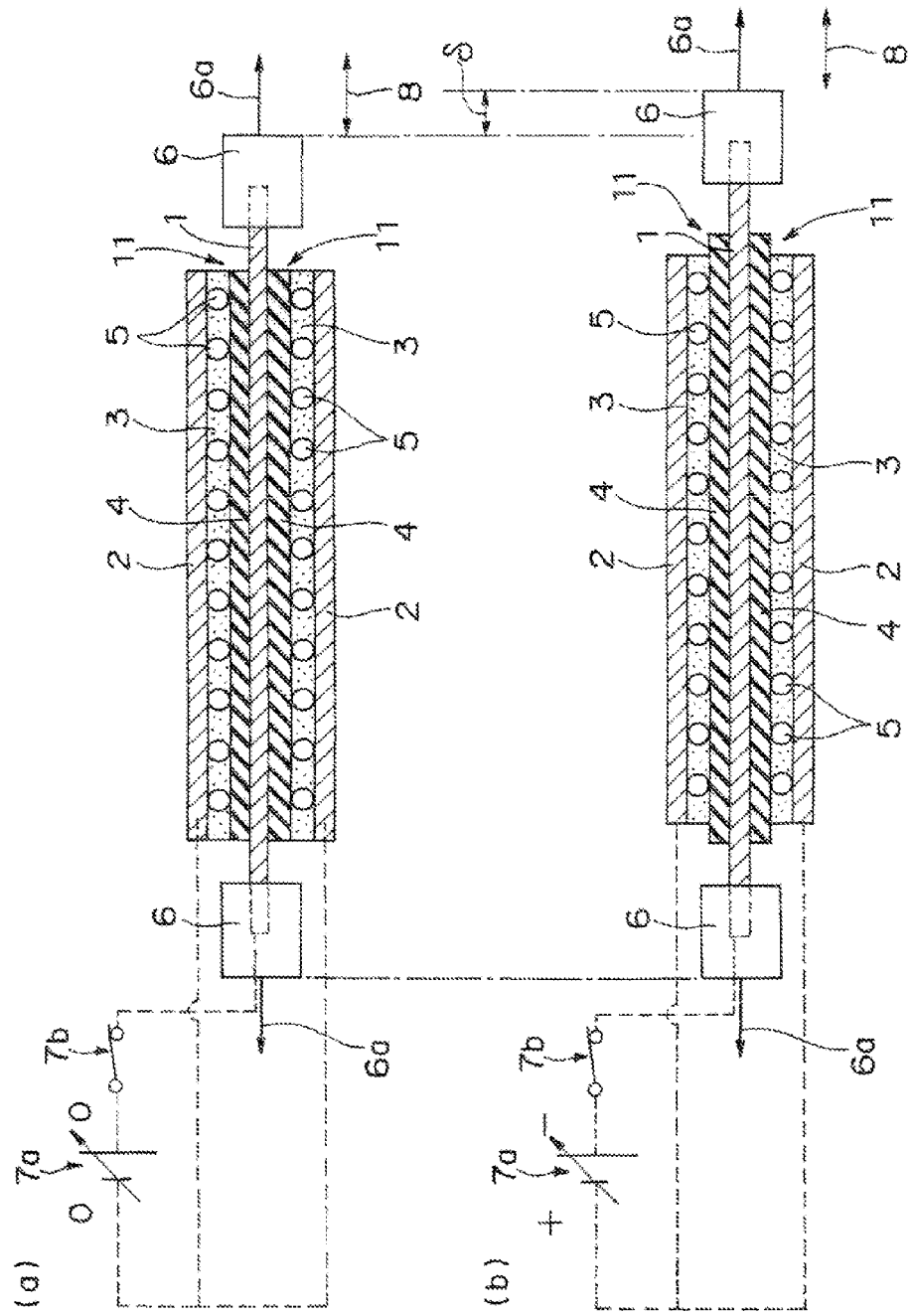
FIG. 8 is a cross-sectional view schematically illustrating the structure of an actuator according to a modification example of the first embodiment of the present invention.

While, in the above description, there has been described a case where the first electrolyte layers 3 are placed at positions in contact with the active member layer 1, and the second electrolyte layers 4 are placed at positions in contact with the second electrode layers 2, it is also possible to interchange their positions. Namely, as illustrated in FIG. 8, the first electrolyte layers 3 may be placed at positions in contact with the second electrode layers 2, and the second electrolyte layers 4 may be placed at positions in contact with the active member layer 1. In the example of FIG. 8, the second electrolyte layers 4 adhere to the active member layer 1, so that the second electrolyte layers 4 expand and contract integrally with the active member layer 1. Further, between the second electrolyte layers 4 and the second electrode layers 2, there are placed first electrolyte layers 3 which have sliding functions and a large number of spacers 5. In the upper view (a) in FIG. 8, the variable direct-current power supply 7a generates a voltage of zero. In the lower view (b) in FIG. 8, the variable direct-current power supply 7a generates a voltage having a positive polarity at the left side of the variable direct-current power supply 7a in FIG. 8, so that a negative voltage is applied to the active member layer 1 with respect to the second electrode layers 2. As a result thereof, in FIG. 8(b), the active member layer 1 expands by a size δ and, along therewith, the second electrolyte layers 4 also expand, in comparison with FIG. 8(a). Also, it is possible to conceive a case where the active member layer 1 and the second electrolyte layers 4 do not adhere to each other, with the same placement structure as that of FIG. 8(a). The second electrolyte layers 4 having the insulation maintaining function are required to have a certain degree of hardness, and therefore, in the case where the active member layer 1 and the second electrolyte layers 4 adhere to each other, the expansion and contraction of the active member layer 1 are obstructed at larger degrees. Therefore, in cases where the second electrolyte layers 4 are placed at positions where the active member layer 1 and the second electrolyte layers 4 contact with each other, it is desirable to provide a structure which allows the second electrolyte layers 4 and the active member layer 1 to slide with respect to each other with smaller friction therebetween.

Figure 9A:
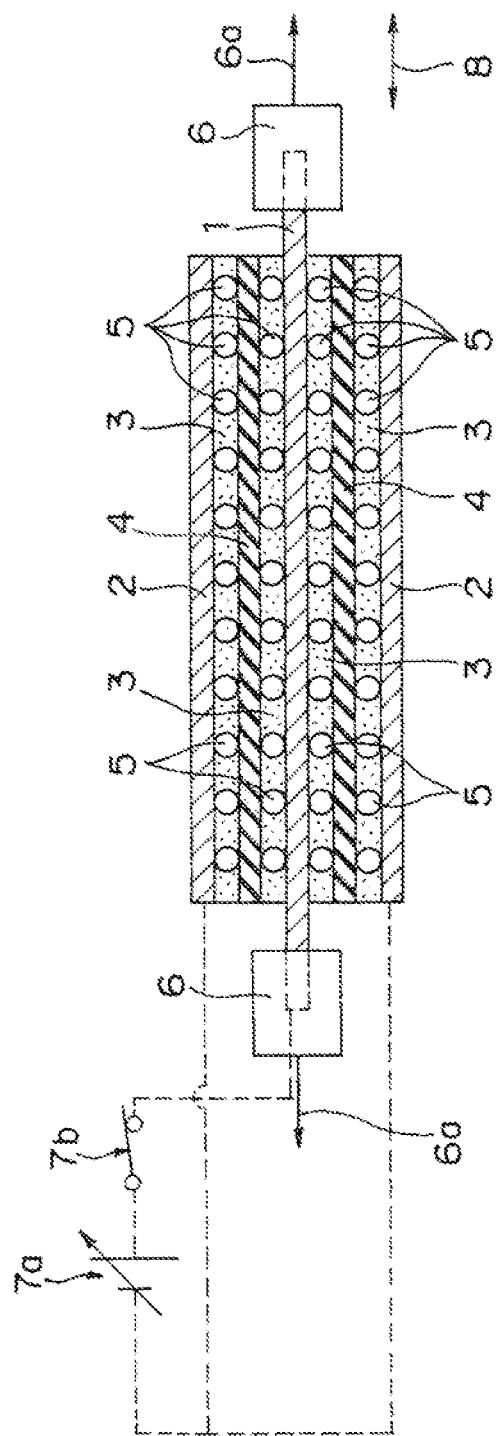
FIG. 9A is a plan view schematically illustrating the structure of an actuator according to a modification example of the first embodiment of the present invention.

While, in the above example, there has been described a structure which places the single first electrolyte layer 3 having the sliding function and the single second electrolyte layer 4 having the insulation maintaining function between the counter electrode (the second electrode layer) 2 and the working electrode (the active member layer) 1, it is also possible to conceive a structure which places plural first electrolyte layers 3 having the sliding function or plural second electrolyte layers 4 having the insulation maintaining function. For example, as illustrated in FIG. 9A and FIG. 9B, it is possible to conceive a structure which places the second electrolyte layers 4 having the insulation maintaining function between the active member layer 1 and the second electrode layers 2 and, further places the first electrolyte layers 3 having the sliding function between the active member layer 1 and the second electrolyte layers 4 and between the second electrode layers 2 and the second electrolyte layers 4. FIG. 9A illustrates an example in which the spacers 5 are mixed in the first electrolyte layers 3. On the other hand, FIG. 9B illustrates an example in which the spacers 5 are not mixed in the first electrolyte layers 3. As an example of the first electrolyte layers 3, it is possible to conceive an ionic liquid or an ionic liquid gel. By employing this structure, with the inner first electrolyte layers 3 placed between the active member layer 1 and the second electrolyte layers 4, it is possible to ensure that both the members can slide with respect to each other. Further, with the outer first electrolyte layers 3 (which are considered to be layers functioning as the third electrolyte layers having the sliding function, for example) placed between the second electrode layers 2 and the second electrolyte layers 4, it is possible to ensure that both the members can slide with respect to each other. Thus, it is possible to drive the actuator more smoothly.

Second Embodiment

Figure 10:
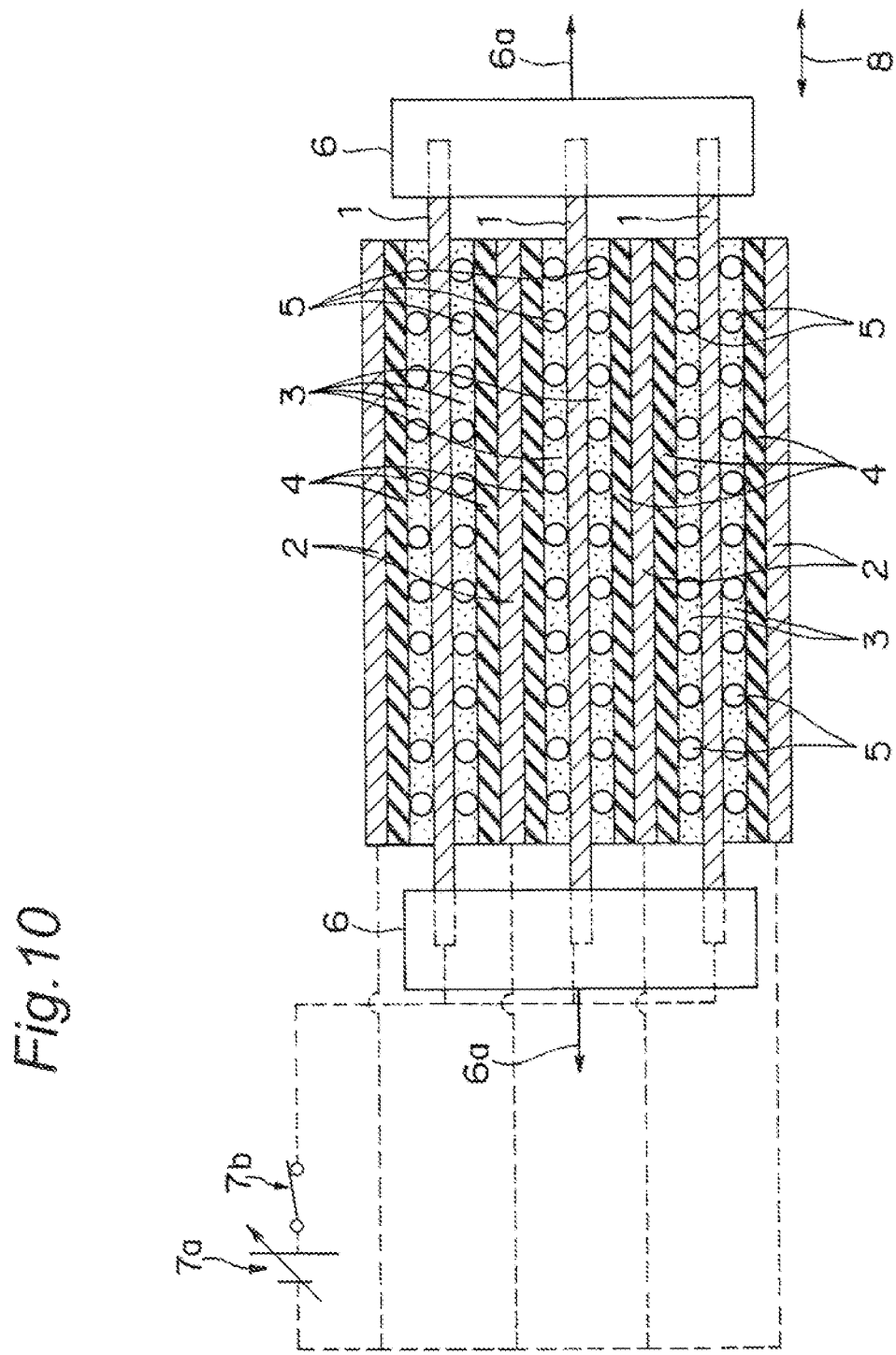
FIG. 10 is a cross-sectional view schematically illustrating an actuator according to a second embodiment of the present invention.

FIG. 10 is a cross-sectional view schematically illustrating the structure of a polymer actuator according to a second embodiment of the present invention.

In the second embodiment, pluralities of second electrode layers 2, second electrolyte layers 4, first electrolyte layers 3, active member layers 1, first electrolyte layers 3, second electrolyte layers 4, and second electrode layers 2 are repeatedly laminated, with the second electrode layers 2 provided as common members. The second electrodes 2, the second electrolyte layers 4, the first electrolyte layers 3, and the active member layers 1 have the structures same as those of the first embodiment. The plurality of active member layers 1 are coupled at the opposite ends to one another by a single force acting portion 6.

In the structure according to the second embodiment, it is possible to generate larger forces, since the active member layers 1 are coupled to one another in parallel with one another.

Third Embodiment

FIG. 11A is a cross-sectional view schematically illustrating the structure of a polymer actuator according to a third embodiment of the present invention.

In the third embodiment, an active member layer 1 adheres at an outer surface thereof to a supporting member 9. The supporting member 9 is a film made of an organic material or a metal, for example, and can be bent in the direction perpendicular to the film surface (in the thickness direction). By applying a voltage between the working electrode (the active member layer 1) and a counter electrode (a second electrode layer 2), the active member layer 1 expands or contracts, and the active member layer 1 and the supporting member 9 integrally perform a bending operation, since the active member layer 1 adheres at the single surface thereof to the supporting member 9.

FIG. 11B schematically illustrates states of bending operations. In a state (a) on the left side in FIG. 11B, a positive voltage is applied from a variable direct-current power supply 7a to the active member layer 1 with respect to the second electrode layer 2. In this example, in the state (a) on the left side, there is illustrated a case where positive ions get out of the active member layer 1 and enter the first electrolyte layer 3, and as a result thereof, the active member layer 1 contracts so that the active member layer 1 and the supporting member 9 bend upward. On the contrary, in the state (b) on the right side in FIG. 11B, a negative voltage is applied from the variable direct-current power supply 7a to the active member layer 1 with respect to the second electrode layer 2. In this example, in the state (b) on the right side, there is illustrated a case where positive ions enter the active member layer 1 from the first electrolyte layer 3, and as a result thereof, the active member layer 1 expands so that the active member layer 1 and the supporting member 9 bend downward.

The actuator having the structure according to the present third embodiment is a bending-type actuator capable of generating larger strains.

While, in the above example, there has been described the case where the active member layer 1 contracts due to entrance and exit of positive ions, it is also possible to conceive a case where the active member layer 1 contracts due to entrance and exit of negative ions. Further, it is also possible to conceive a case where the active member layer 1 contracts due to entrance and exit of positive ions and negative ions.

Further, in the third embodiment, it is possible to further provide a contact maintaining member or a sealing member 10, similarly to the first embodiment.

(Insulation Enhancing Effect)

Figure 12A:
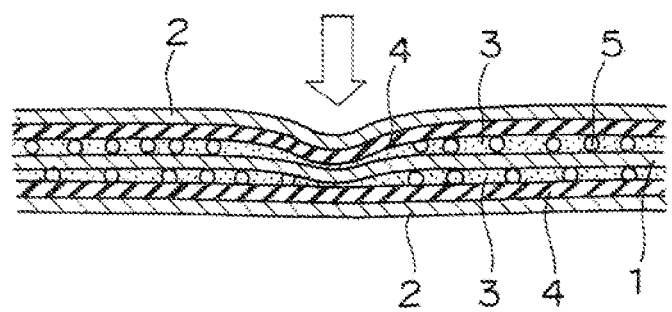
FIG. 12A is a cross-sectional view illustrating enhancement of the insulation in the actuator according to the first embodiment of the present invention.
Figure 12B:
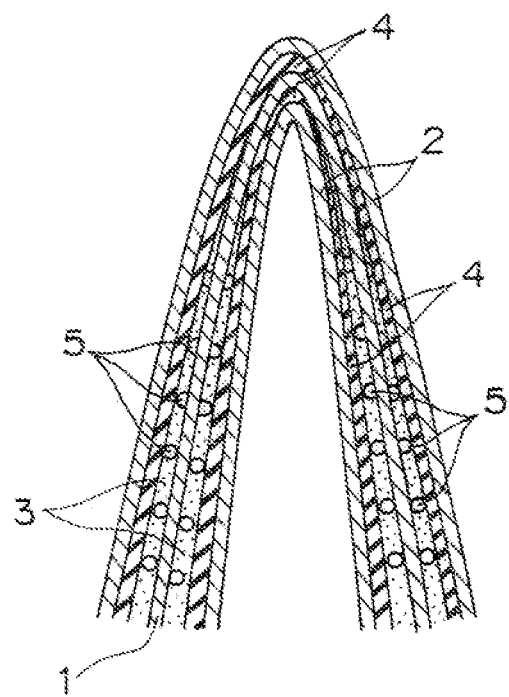
FIG. 12B is another cross-sectional view illustrating enhancement of the insulation in the actuator according to the first embodiment of the present invention.

FIG. 12A and FIG. 12B are schematic views in a case where the actuator according to the first embodiment is subjected to a strong external force, and a case where it is largely bent. In any of these cases, at the portion being subjected to the large external force and at the portion being largely bent, even if the first electrolyte layers 3 move to other portions, the second electrolyte layers 4 certainly exist between the active member layer 1 and the second electrode layers 2, so that the second electrolyte layers 4 certainly ensure the insulation between the active member layer 1 and the second electrode layers 2. Also in the embodiments other than the first embodiment, it is possible to ensure, with the second electrolyte layers 4, the insulation between the active member layer 1 and the second electrode layers 2.

(Contents of Experiments about Driving)
(Materials Used in the Experiments)

There were used polypyrrole films fabricated by electrolytic polymerization, under the following conditions. An electrolytic solution used therein was a solution obtained by dissolving in Propylene carbonate (PC) 0.06 M pyrrole, 0.06 M tetrabutylammonium hexafluorophosphate (TBA-PF$_6$), and 1%/vol-H$_2$O. Pyrrole was purchased from Sigma-Aldrich Japan Corporation and was used after distillation. A glassy carbon substrate (GC substrate) was employed as the working electrode for use in electrolyte polymerization, while porous carbon substrates were employed as second electrode layers 2. As a reference electrode for electrolyte polymerization, Ag/Ag+ was employed. Electrolyte polymerization was performed for 18 hours, with a current density of 0.05 mA/cm², at a temperature of −28° C., according to the method same as that in Non-Patent Document 1 to be described below, using a galvanostat (HA-151) manufactured by Hokuto Denko Corporation (Japan). Thereafter, the resultant was rinsed in PC, and then the polypyrrole films were used in a state of being separated from the GC substrates or in a state of being kept to adhere to the substrates. The film thicknesses of the polypyrrole films were in the range of 10 to 15 μm, and the conductivities were in the range of 200 to 300 S/cm.

An ionic liquid used therein was 1-ethyl-3-methylimidazolium bis(trifluoromethanesulfonyl)imide (EMI-TFSI) purchased from Toyo Gosei Co., Ltd. Insulation separator sheets used therein were condenser-intended separators made of cellulose and having a film thickness of 40 μm, which were manufactured by Nippon Kodoshi Corporation. As micro beads (spacers), Micropearls SP (14 μm to 50 mμm φ) manufactured by Sekisui Chemical Corporation were used in a state of being dispersed in an ionic liquid EMI-TFSI at a concentration of about 0.6 wt %.

Non-Patent Document 1 in this case refers to "Yamaura, M.; Hagiwara, T.; Iwata, K., "Enhancement of electrical conductivity of polypyrrole film by stretching: counter ion effect", Synth. Met. (1988), 26(3), 209-224".

(The Structures of Actuators Subjected to Experiments)

The following three actuators according to the above embodiments were fabricated and subjected to experiments.

(First Actuator)

Figure 13A:
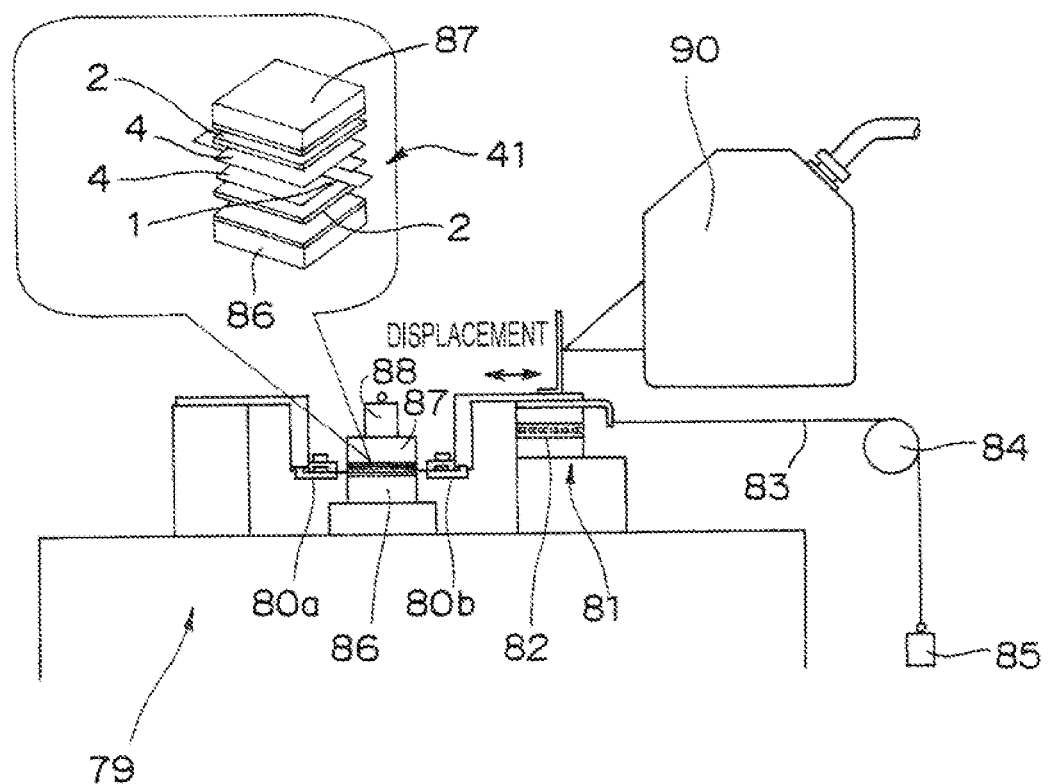
FIG. 13A is an explanation view illustrating the structure upon performing experiments about driving of first and second actuators, according to the first embodiment of the present invention.

FIG. 13A illustrates the structure of a first actuator 41.

A polypyrrole film was employed as the active member layer 1 and, further, at positions thereabove and thereunder, two second electrode layers were placed. As the second electrode layers 2, glassy carbon substrates (25 mm×30 mm×1 mm) each having a polypyrrole film formed on one surface thereof were employed and were placed such that the surfaces of the polypyrrole films were opposed to the active member layer 1. Between the second electrode layers 2 and the active member layer 1, there were placed first electrolyte layers 3 made of an ionic liquid and containing a large number of micro beads as spacers 5, and second electrolyte layers 4 formed by separator sheets impregnated with an ionic liquid, and thus, the first actuator 41 was formed. In FIG. 13A, the first electrolyte layers and the micro beads are not illustrated.

The first actuator 41 and a drive experiment apparatus 79 were assembled according to the following method.

The polypyrrole film to form the active member layer 1, which was cut into 6 mm×42 mm, was connected to the drive experiment apparatus 79 outside the first actuator, such that its opposite end portions each having a length of about 4 mm were held by holding portions 80a and 80b. The holding portion 80a was fixed, while the other holding portion 80b was made slidable freely in the horizontal direction by a linear guide 81 having a slider 82. A 10 g weight 85 was connected to the latter holding portion 80b with use of a pulley 84 and a string 83.

A substrate as a second electrode layer 2 and a separator sheet as a second electrolyte layers 4 were overlaid on a ceramic block 86, and an ionic liquid containing a sufficient amount of beads, as a first electrolyte layer 3, was dropped thereon.

Next, the polypyrrole film to form the active member layer 1 was moved to a position in contact with the upper surface of the ionic liquid containing the beads as the first electrolyte layer 3.

Thereafter, an ionic liquid containing a sufficient amount of beads, as a first electrolyte layer 3, was dropped on the upper surface of the polypyrrole film as the active member layer 1.

Lastly, a separator sheet as a second electrolyte layer 4, a second electrode layer 2, a ceramic block 87 and a 20 g weight 88 were placed thereon to press the first actuator 41. Further, respective rubbers were attached to the surfaces of the ceramic blocks 86 and 87, in order to uniformly transmit forces.

The thickness of the polypyrrole film as the active member layer 1 was about 10 μm, and therefore, in the state where the 10 g weight 85 was suspended therefrom, the internal stress was equal to about 1.6 MPa.

(Second Actuator)

The second actuator also has the structure shown in FIG. 13A, similarly to the first actuator 41.

An active member layer 1 and second electrode layers 2 used therein were the same as those of the first actuator. Further, similarly to in the first actuator 41, the polypyrrole surfaces in the substrates as the second electrode layers 2 were placed to oppose to the active member layer 1. The active member layer 1 was held at the opposite ends by holding portions 80a and 80b in the same way as that for the first actuator 41, and a 10 g weight 85 was connected to the holding portion 80b with use of a string 83 and a pulley 84. Between the second electrode layers 2 and the active member layer 1, there were placed first electrolyte layers 3 made of an ionic liquid and containing a large number of micro beads as spacers 5, and second electrolyte layers 4 formed by an ionic liquid gel fabricated according to the following method, and thus, the second actuator was formed.

In fabricating the second electrolyte layers 4, firstly, a separator was placed inside a metal die, and then, a mixture of an ionic liquid (EMI-TFSI) and PVDF/HFP (KYNAR FLEX 2500) (registered trademark) at 8:2 was added from thereabove. Then, the resultant was gelled by heating at 100° C. for 45 minutes, and then, the frame was removed therefrom to fabricate an ionic liquid gel having a predetermined shape.

The second actuator and a drive experiment apparatus 79 were assembled according to the following method.

A substrate as a second electrode layer 2 and an ionic liquid gel as a second electrolyte layer 4 were overlaid on a ceramic block 86, and an ionic liquid containing a sufficient amount of beads, as a first electrolyte layer 3, was dropped thereon.

Next, a polypyrrole film to form the active member layer 1 was moved to a position in contact with the upper surface of the ionic liquid containing the beads, as the first electrolyte layer 3.

Thereafter, an ionic liquid containing a sufficient amount of beads, as a first electrolyte layer 3, was dropped on the upper surface of the polypyrrole film as the active member layer 1.

Lastly, an ionic liquid gel as a second electrolyte layer 4, a second electrode layer 2, a ceramic block 87, and a 20 g weight 88 were placed thereon to press. Further, rubbers were attached to the surfaces of the ceramic blocks 86 and 87, respectively, in order to uniformly transmit forces.

Further, the ionic liquid gel was used, after being immersed in an ionic liquid for 1 hour or more.

(Third Actuator)

Figure 13B:
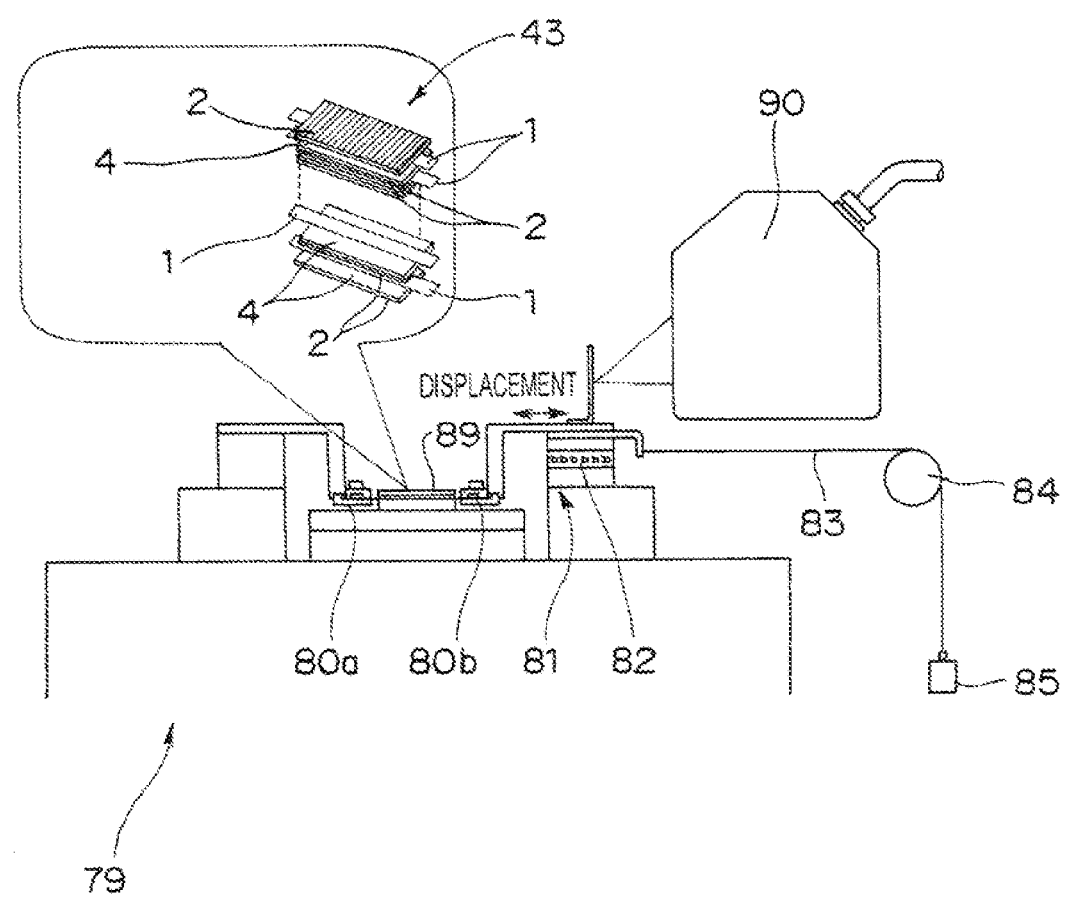
FIG. 13B is an explanation view illustrating the structure upon performing experiments about driving of a third actuator according to the second embodiment of the present invention.

A third actuator 43 has a structure including polypyrrole films and separator sheets impregnated with an ionic liquid, which are alternately laminated, as illustrated in FIG. 13B. The third actuator 43 was assembled according to the following method.

Polypyrrole films to operate as active member layers 1 cut into a rectangular shape were employed. Firstly, the plural polypyrrole films to operate as the active member layers 1 were laminated, then adhere to one another at the opposite ends by adhesive copper foil tapes (Scotch (registered trademark) conductive tapes manufactured by Sumitomo 3M Corporation), and thereafter were fixed by being pinched with use of a clamp.

Next, second electrode layers 2 formed by polypyrrole films having a size of about 25 mm×10 mm were brought into contact with the active member layers 1, between the active member layers 1 and at positions thereabove and thereunder.

Further, insulating separators as second electrolyte layers 4 were inserted between the active member layers 1 and the second electrode layers 2, and an ionic liquid containing a sufficient amount of beads (14 μm φ), as first electrolyte layers 3, was dropped between the separators and the active member layers 1.

Lastly, a plastic plate 89 was placed on the uppermost portion thereof to press with the weight of the plastic plate 89. Prototypes were obtained for three cases where the number of laminated active member layers 1 was two, three, and nine. The width of the active member layers 1 was set to 6 mm in the cases of the two-layer structure and the three-layer structure, and was set to 3 mm in the case of the nine-layer structure. The weight of the weight 85 connected to an end portion of the third actuator 43 was changed within the range of 5 g to 300 g.

Further, for all the structures described above, electric contacts to the active member layers 1 and the second electrode layers 2 were extracted in such a way of being in contact with platinum foils.

(Driving Method)

In each experiment about driving, each actuator was driven at ±1.5 V rectangular waves from the variable direct-current power supply 7a. Further, prior to evaluations about driving, each actuator was caused to perform an appropriate number of expanding and contracting operations, and after the operation of each actuator was stabilized; experiments were conducted. The first actuator 41 and the second actuator were driven at respective frequencies of 0.1 Hz, 0.5 Hz, 1 Hz, 5 Hz, and 10 Hz. The third actuator 43 was driven at a frequency of 0.5 Hz. In the cases of all the actuators, a voltage from the variable direct-current power supply 7a was applied between the second electrode layers 2 and the active member layers 1 which were made of polypyrrole for driving all the actuators.

The strain of each actuator was determined by a laser strain meter 90. As the laser strain meter 90, LK-030 manufactured by Keyence Corporation was employed. A LabVIEW program and a DAQ board manufactured by National Instruments Corporation were employed for controlling a potentiostat and for recording the strain, the voltage and the current. As the potentiostat, a galvanostat (HA-151) manufactured by Hokuto Denko Corporation was employed. In all the experiments, the value of the size of strain divided by 25 mm was calculated as a strain rate, in consideration of the fact that the portions of the active member layers 1 which actually perform expanding and contracting operations had a length of 25 mm since the length of the second electrode layers 2 was 25 mm. All the experiments about driving were conducted at room temperatures.

(Results of Experiments)

(Results of Experiments about Driving of the First Actuator 41)

Figure 14A:
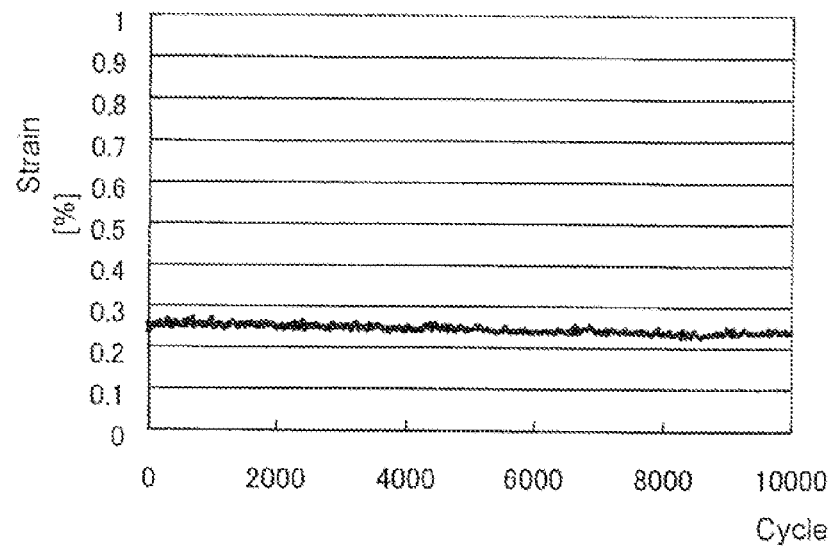
FIG. 14A is a graph illustrating the change of the amplitude during 10000-time driving, as a result of experiments about driving of the first actuator according to the first embodiment of the present invention.
Figure 14B:
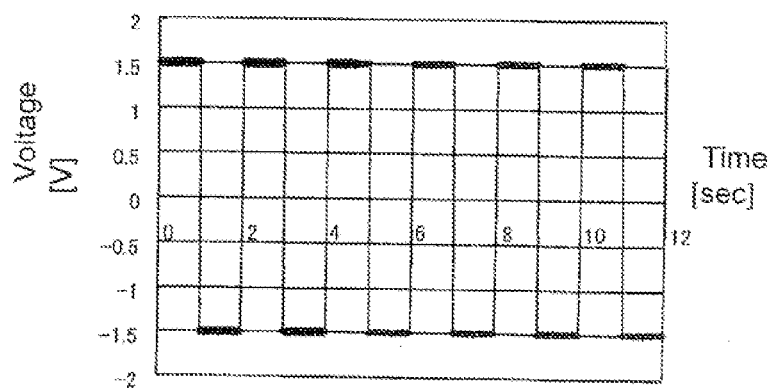
FIG. 14B is a graph illustrating the relationship between the voltage and the time during 10000-time driving, as a result of experiments about driving of the first actuator according to the first embodiment.
Figure 14C:
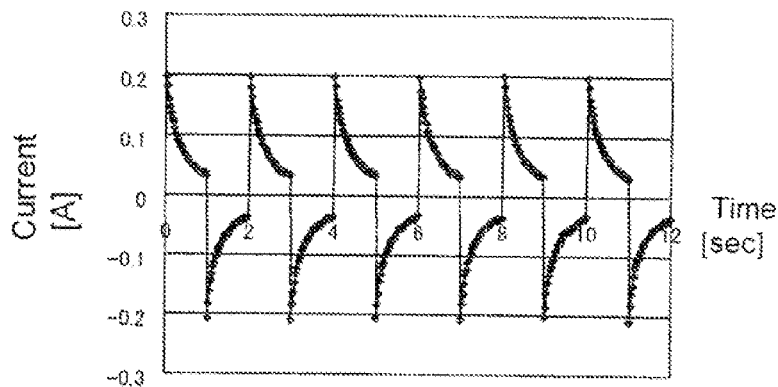
FIG. 14C is a graph illustrating the relationship between the current and the time during 10000-time driving, as a result of experiments about driving of the first actuator according to the first embodiment.
Figure 14D:
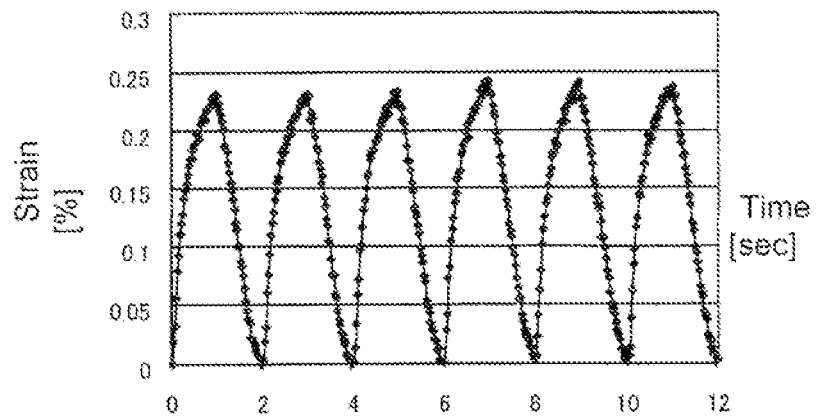
FIG. 14D is a graph illustrating the relationship between the strain and the time during 10000-time driving, as a result of experiments about driving of the first actuator according to the first embodiment.
Figure 14E:
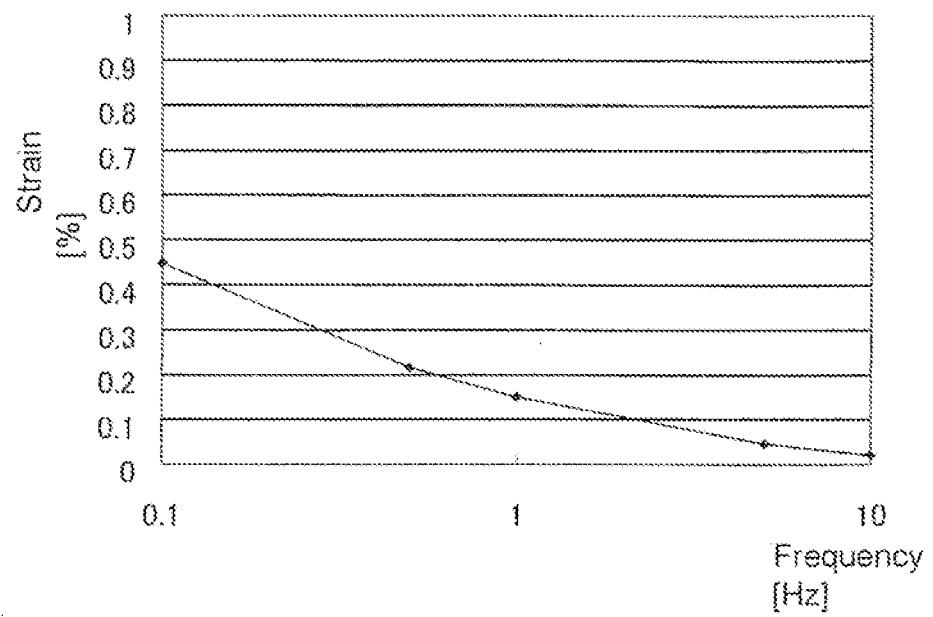
FIG. 14E is a graph illustrating a frequency characteristic, as a result of experiments about driving of the first actuator according to the first embodiment.

The actuator was driven 10000 times at 1.5 V and 0.5 Hz, and thereafter, was subjected to experiments about driving at respective frequencies. All the experiments were conducted in a state where the temperature and the humidity were maintained at 20° C. and 65% using a constant-temperature/constant-humidity bath. An interval of 5 minutes was provided between the experiments. FIG. 14A illustrates amplitude changes during the 10000-time driving. In FIG. 14A, the vertical axis represents the strain rate (%), while the horizontal axis represents the number of experiments (cycles). FIG. 14B to FIG. 14D illustrate temporal changes of the voltage, the current, and the strain during the 10000-time driving. FIG. 14E illustrates a frequency characteristic of the present structure. In FIG. 14E, the vertical axis represents the strain rate (%), while the horizontal axis represents the frequency (Hz).

As a result of these experiments about driving, the amplitude was stabilized at about 0.25% during the 10000-time driving at 0.5 Hz.

(Results of Experiments about Driving of the Second Actuator)

Figure 15A:
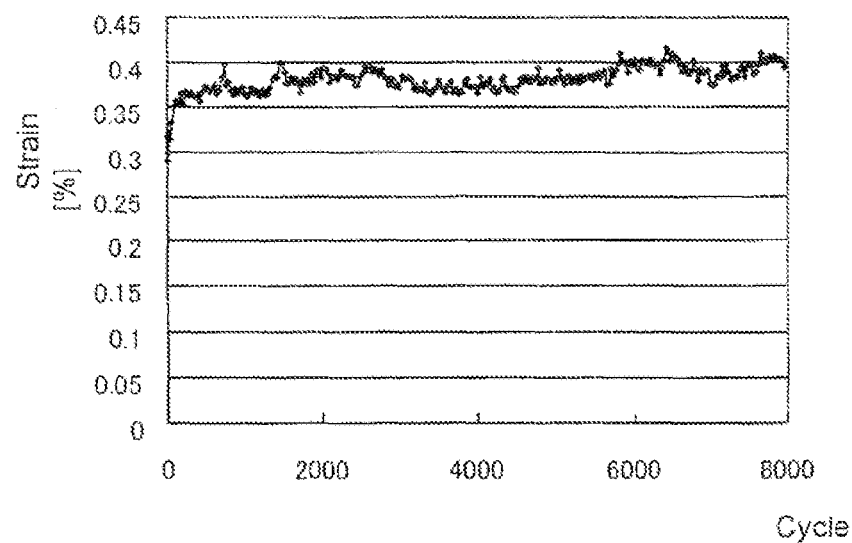
FIG. 15A is a graph illustrating the change of the amplitude during 8000-time driving, as a result of experiments about driving of the second actuator according to the first embodiment of the present invention.
Figure 15B:
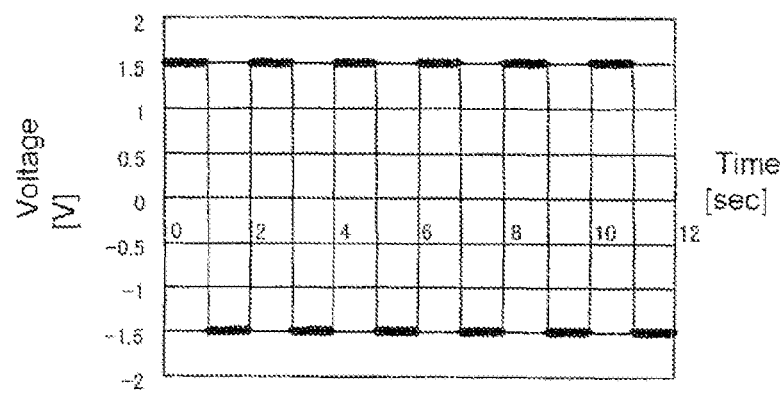
FIG. 15B is a graph illustrating the relationship between the voltage and the time during 8000-time driving, as a result of experiments about driving of the second actuator according to the first embodiment.
Figure 15C:
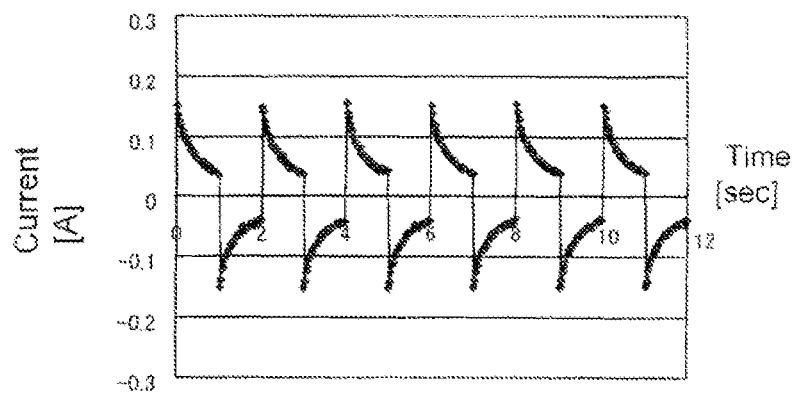
FIG. 15C is a graph illustrating the relationship between the current and the time during 8000-time driving, as a result of experiments about driving of the second actuator according to the first embodiment.
Figure 15D:
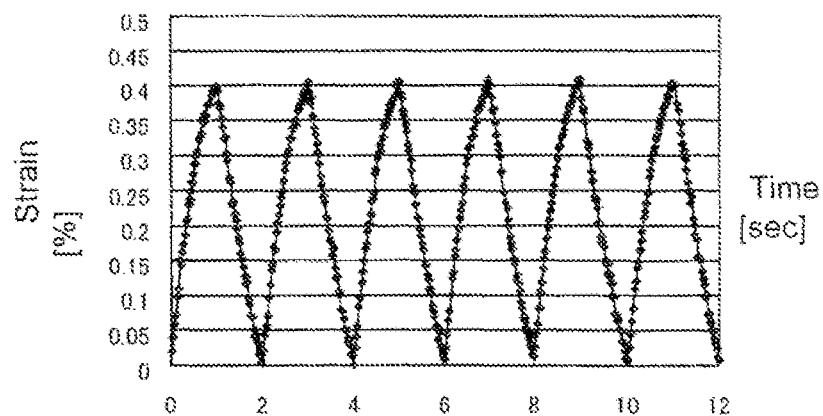
FIG. 15D is a graph illustrating the relationship between the strain and the time during 8000-time driving, as a result of experiments about driving of the second actuator according to the first embodiment.
Figure 15E:
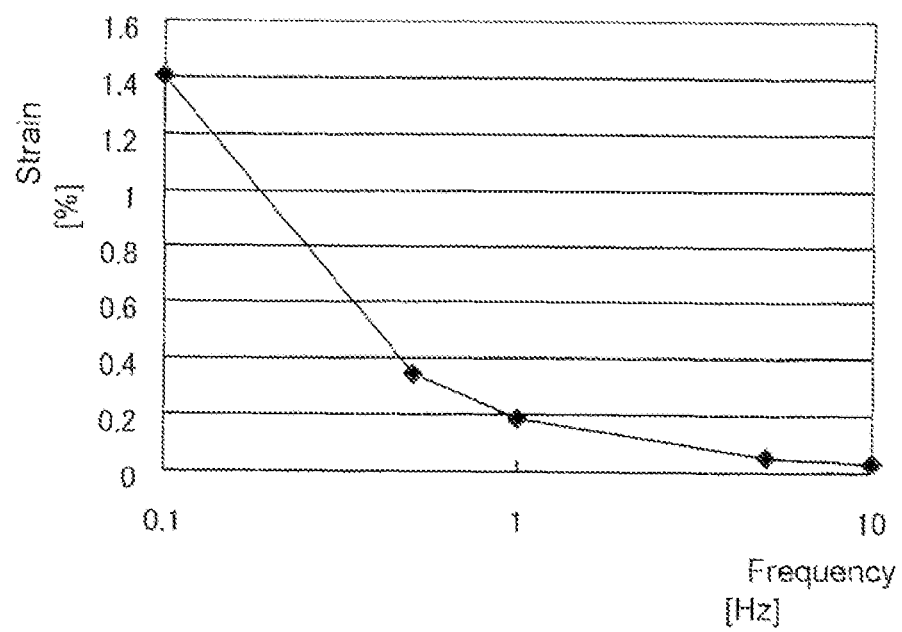
FIG. 15E is a graph illustrating a frequency characteristic, as a result of experiments about driving of the second actuator according to the first embodiment.

The actuator was driven 10000 times at 1.5 V and 0.5 Hz, and thereafter, was subjected to experiments about driving at respective frequencies. In this case, in the 10000-time driving, after the actuator was driven 2000 times, an interval was provided and then the actuator was driven 8000 times. All the experiments were conducted in a state where the temperature and the humidity were maintained at 20° C. and 65% using a constant-temperature/constant-humidity bath. An interval of 5 minutes was provided between the experiments at respective frequencies. FIG. 15A illustrates amplitude changes during the 8000-time driving. In FIG. 15A, the vertical axis represents the strain rate (%), while the horizontal axis represents the number of experiments (cycles). FIG. 15B to FIG. 15D illustrate temporal changes of the voltage, the current, and the strain during the 8000-time driving. FIG. 15E illustrates a frequency characteristic of the present structure. In FIG. 15E, the vertical axis represents the strain rate (%), while the horizontal axis represents the frequency (Hz).

As a result of these experiments about driving, the amplitude was stabilized at about 0.4% during the 8000-time driving at 0.5 Hz.

(Results of Experiments about Driving of the Third Actuator)

Figure 16A:
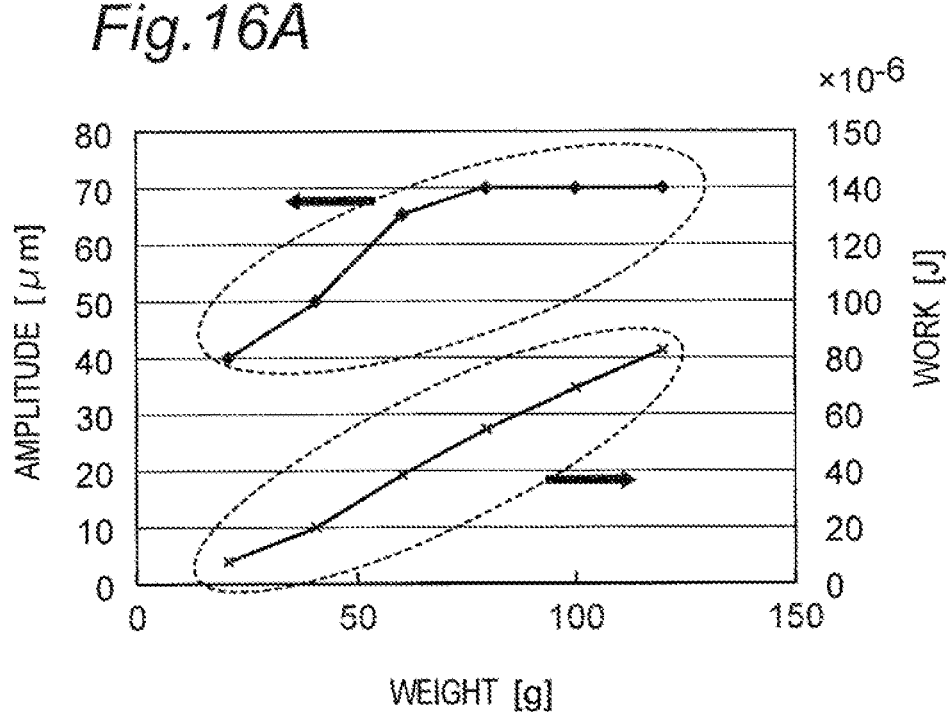
FIG. 16A is a graph illustrating the changes of the operation amplitude and the amount of work, as a result of experiments about driving of the third actuator according to the second embodiment of the present invention.
Figure 16B:
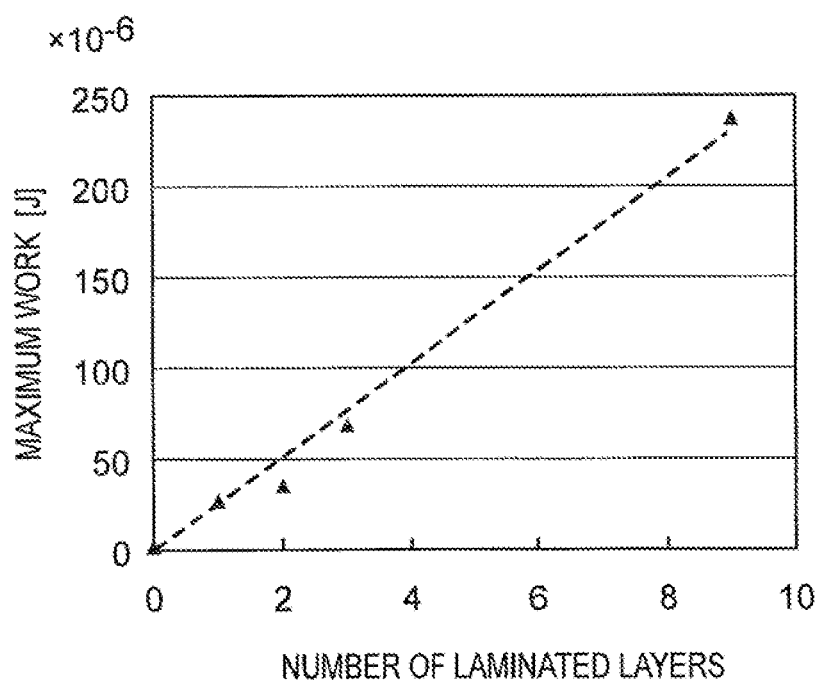
FIG. 16B is a graph illustrating the relationship between the number of films and the maximum amount of work, as a result of experiments about driving of the third actuator according to the second embodiment.
Figure 17A:
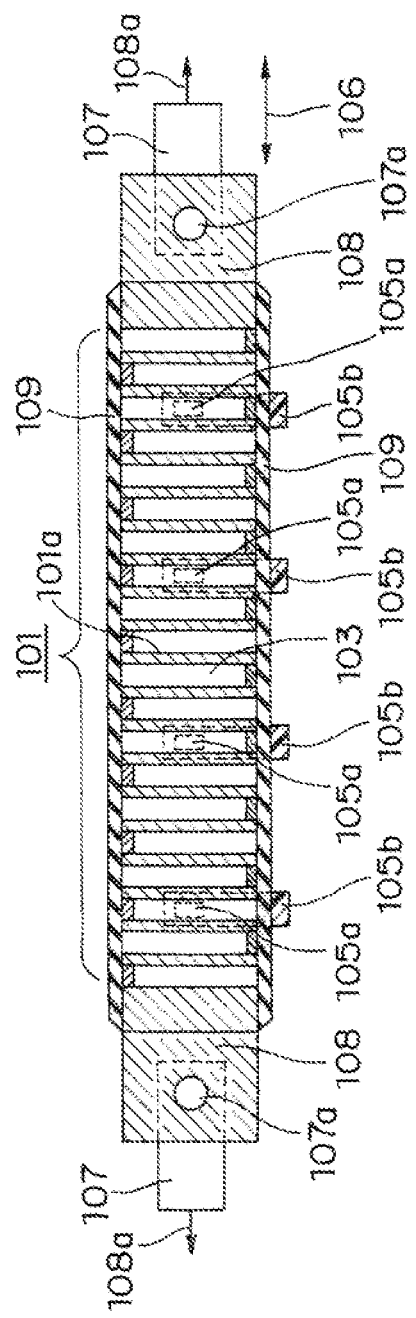
FIG. 17A is a plan view illustrating the structure of an actuator according to a conventional art.
Figure 17B:
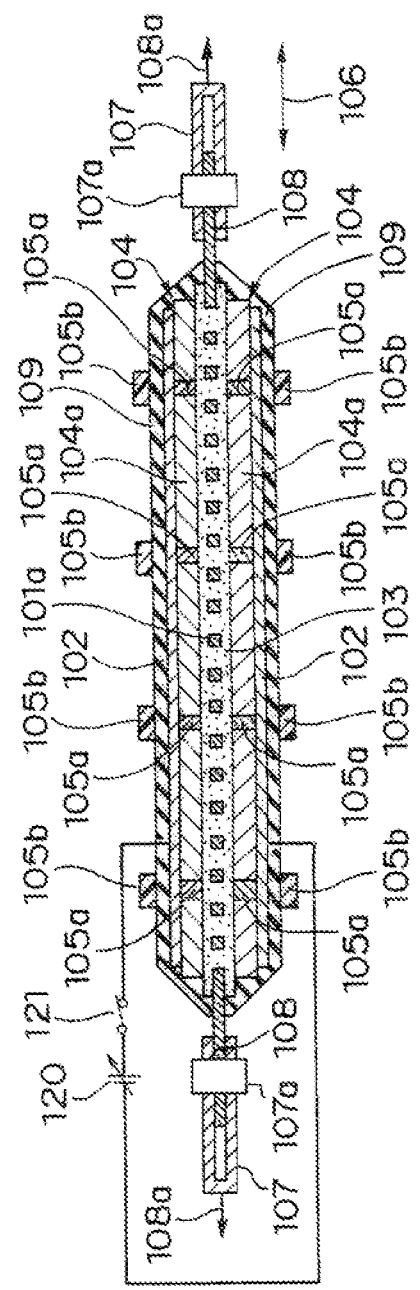
FIG. 17B is a plan view illustrating the structure of the actuator according to the conventional art.
Figure 17C:
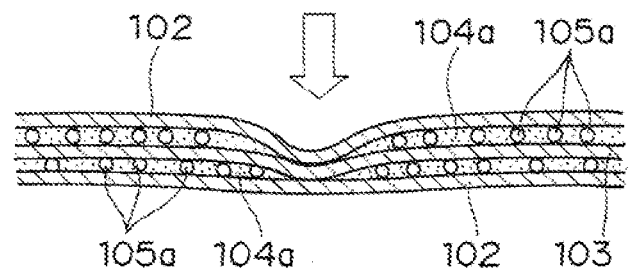
FIG. 17C is a cross-sectional view illustrating a state where a large force is applied to films in the actuator according to the conventional art, in the direction perpendicular thereto, to degrade the insulation between the electrodes.
Figure 17D:
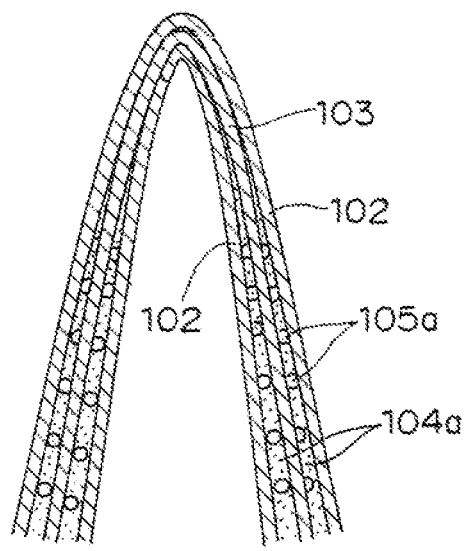
FIG. 17D is a cross-sectional view illustrating a state where the films in the actuator according to the conventional art are bent to degrade the insulation between the electrodes.
Figure 17E:
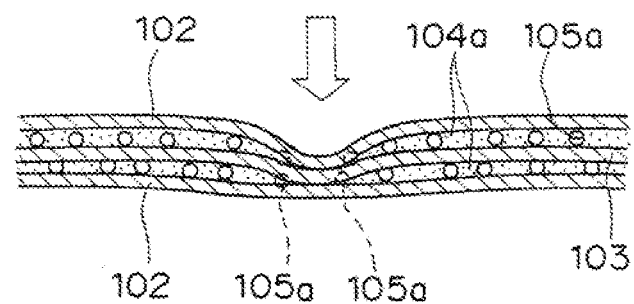
FIG. 17E is a cross-sectional view illustrating a state where the insulation between the electrodes is degraded in the actuator according to the conventional art.

FIG. 16A is a view illustrating the changes of the operation amplitude and the amount of work, in cases of changing the weight of the weight 85, during the experiments about driving the three-layer structure at 1.5 V and 0.5 Hz. In this case, the amount of work was determined from the product of the amplitude and the weight of the weight 85. As can be seen in FIG. 16A, the amount of work was increased with increasing the weight of the weight 85. It can be considered that, when the weight of the weight 85 was smaller, the actuator was partially loosened to prevent portions of the expanding and contracting operations from being transmitted to the outside due to a slight difference in the lengths of the actuators, and on the other hand, when the weight of the weight 85 was larger, the actuator was brought into a tensioned state with an appropriate tension, thereby causing the expanding and contracting operations of the actuator to be efficiently transmitted to the outside. However, when the weight 85 weighed 120 g, there was prominently observed a phenomenon that the length of the actuator was increased with time (a creep phenomenon). Therefore, it can be considered that the upper limit of the weight of the weight 85 is about 100 g, in order to stably operate the actuator. In this case, the amount of work of the polypyrrole was about 69 μJ. The same experiments were conducted with the nine-layer laminated structure, and as a result thereof, the nine-layer laminated structure was capable of performing the expanding and contracting operations by 40 μm with a 300 g weight 85, within a range inducing no creep. In this case, the amount of work was about 120 μJ. FIG. 16B is a view illustrating the relationship between the number of films and the amount of work, as a result of the same experiments. FIG. 16B illustrates maximum amounts of work within ranges inducing no continuous creep. Further, for the nine-layer structure, these values are indicated by converting the width of the polypyrrole films to 6 mm. It can be seen, from FIG. 16B, that the amount of generated work was increased with the number of laminated layers substantially in proportion thereto. Further, the approximate thicknesses of the electrolyte layers in the present structure can be approximately calculated from the sum of the thickness of the separator and the diameter of micro beads. Here, the sum of the thicknesses of the upper and lower electrolyte layer portions 11 in contact with the single active member layer 1 is about 108 μm. The thickness of each single actuator in a laminated-layer structure can be calculated from the sum of the thicknesses of the active member layer 1, the second electrode layers 2, and the electrolyte layer portions 11, and it can be determined to be 128 μm, on the assumption that the thickness of a polypyrrole film is 10 μm. The area of the effective portion of the active member layer 1 can be considered to be the area of contact with the second electrode layers 2 (25 mm×3 mm). Therefore, the volume of the effective portion of the actuator having the nine-layer structure can be determined to be about 86 $mm^3$. By dividing the amount of work by the effective volume, it is possible to determine, by calculation, the amount of work per unit volume to be 1400 $J/m^3$, in the case of driving at 0.5 Hz. Further, on the assumption that the specific gravities of the polypyrrole and the EMI-TFSI are 1.4 $g/cm^3$ and 1.5 $g/cm^3$ respectively, the amount of work per unit mass can be determined to be 0.92 J/kg.

Further, the first actuator structured to include no separator will form an exemplary actuator according to a conventional example. It has been verified that, in this case, the magnitude of the amplitude of strain is substantially equal to the magnitude of the amplitude of strain in the first actuator.

As described above, with the actuators according to the above embodiments and modification examples, it is possible to enhance the insulation between the electrode layers 1 and 2 in comparison with the conventional actuators, thereby providing the strain amplitudes having magnitudes equivalent to those of the conventional actuators. In other words, it is possible to enhance the electric insulation between the electrode layers 1 and 2, in comparison with the conventional actuators, while enabling smooth expansion and contraction operations and also maintaining a driving ability similar to those of conventional actuators.

Further, since the distance between the electrode layers 1 and 2 can be maintained smaller, it is possible to maintain the volume of the entire actuator smaller, thereby enabling work in a light-weighted structure.

Further, the second actuator has strain amplitudes larger than those of the first actuator 41, which can be considered to be caused by one of the facts that the ionic liquid gel has smaller friction at the surface, thereby enabling the active member layer 1 to expand and contract more efficiently. It is considered that, with the structure of the second actuator, the ionic liquid which seeped from the inside of the gel contributes to the slidability when the ionic liquid gel was subjected to loads. Particularly, a physical gel formed by PVDF or the like is wet and slidable at the surface thereof, which exerts a large effect of allowing the actuator to operate efficiently. In general, polymer gels mainly contain a liquid while being solids, and therefore, they exhibit significantly low friction coefficients due to their specific friction mechanisms. In cases of employing a polymer gel as the second electrolyte layers, it is possible to enhance the insulation between the electrodes by the polymer gel and it is also possible to operate the actuator efficiently using the property of the polymer gel of exhibiting a lower friction coefficient.

By properly combining arbitrary embodiments or modification examples of the aforementioned various embodiments and modification examples, the effects owned by each of them can be made effectual.

INDUSTRIAL APPLICABILITY

The polymer actuator according to the present invention is usable as an actuator having a small-sized, light-weighted, and flexible driving source for use in various types of apparatuses represented by caring or domestic robots or mobile apparatuses.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A polymer actuator comprising:
a first electrode layer as a conductive active member layer;
a second electrode layer opposing to the first electrode layer;
an electrolyte layer portion that is placed between the first electrode layer and the second electrode layer and includes a first electrolyte layer and, a second electrolyte layer having a function of maintaining insulation between the first electrode layer and the second electrode layer; and
a plurality of particle-shaped spacers that are placed in the first electrolyte layer, contact with both the first electrode layer and the second electrolyte layer, a part of the spacers being movable relatively to one of the first electrode layer and the second electrolyte layer; wherein
the polymer actuator is driven by a voltage that is applied between the electrode layers.

2. The polymer actuator according to claim 1, wherein the first electrolyte layer is placed at a position in contact with the first electrode layer, and the second electrolyte layer is placed at a position in contact with the first electrolyte layer and in contact with the second electrode layer.

3. The polymer actuator according to claim 1, wherein the first electrolyte layer is placed at a position in contact with the second electrode layer, and the second electrolyte layer is placed at a position in contact with the first electrolyte layer and in contact with the first electrode layer.

4. The polymer actuator according to claim 1, wherein the first electrolyte layer is placed at a position in contact with the first electrode, and the second electrolyte layer is placed at a position in contact with the first electrolyte layer, and
the polymer actuator further comprising between the second electrolyte layer and the second electrode layer, a third electrolyte layer that exerts a function of sliding relatively to the second electrode layer and the second electrolyte layer.

5. The polymer actuator according to claim 1, wherein the second electrolyte layer includes an insulation maintaining member having an electrically insulating function and a second electrolyte layer member infiltrated in the insulation maintaining member.

6. The polymer actuator according to claim 5, wherein the insulation maintaining member is a separator.

7. The polymer actuator according to claim 5, wherein the second electrolyte layer is an ionic liquid.

8. The polymer actuator according to claim 1, wherein the second electrolyte layer is a gel impregnated with ions.

9. The polymer actuator according to claim 8, wherein the second electrolyte layer is made of an ionic liquid and a gel containing polyvinylidene fluoride.

10. The polymer actuator according to claim 1, wherein the first electrolyte layer contains an ionic liquid.

11. The polymer actuator according to claim 1, wherein the first electrolyte layer is a gel containing an ionic liquid.

12. The polymer actuator according to claim 1, further comprising:
- second electrode layers including the second electrode layer; and
- an inter-electrode holding member that is placed between the second electrode layers and constantly maintains a distance between the second electrode layers.

13. The polymer actuator according to claim 1, further comprising a supporting member that is secured to an outer side of the first electrode layer.

14. The polymer actuator according to claim 1, wherein each of the particle-shaped spacers has a size from 0.1 to 100 times a thickness of the conductive active member layer.

* * * * *